United States Patent
Bertagnolli et al.

(10) Patent No.: US 10,119,334 B1
(45) Date of Patent: Nov. 6, 2018

(54) POLYCRYSTALLINE DIAMOND COMPACT INCLUDING SUBSTANTIALLY SINGLE-PHASE POLYCRYSTALLINE DIAMOND BODY AND APPLICATIONS THEREFOR

(71) Applicant: US SYNTHETIC CORPORATION, Orem, UT (US)

(72) Inventors: Kenneth E. Bertagnolli, Riverton, UT (US); C. Eugene McMurray, Galion, OH (US)

(73) Assignee: US SYNTHETIC CORPORATION, Orem, UT (US)

( * ) Notice: Subject to any disclaimer, the term of this patent is extended or adjusted under 35 U.S.C. 154(b) by 286 days.

(21) Appl. No.: 14/987,440

(22) Filed: Jan. 4, 2016

Related U.S. Application Data

(62) Division of application No. 13/397,977, filed on Feb. 16, 2012, now Pat. No. 9,254,554.

(51) Int. Cl.
  *E21B 10/46* (2006.01)
  *B22F 7/00* (2006.01)
  *E21B 10/12* (2006.01)

(52) U.S. Cl.
  CPC .................................. *E21B 10/12* (2013.01)

(58) Field of Classification Search
  CPC .......... E21B 10/12; E21B 10/36; E21B 10/46; B22F 7/00
  See application file for complete search history.

(56) References Cited

U.S. PATENT DOCUMENTS

| | | | |
|---|---|---|---|
| 4,604,106 A | 8/1986 | Hall et al. | |
| 4,629,373 A | 12/1986 | Hall | |
| 5,954,147 A | 9/1999 | Overstreet et al. | |
| 6,042,463 A | 3/2000 | Johnson et al. | |
| 6,338,754 B1 | 1/2002 | Cannon et al. | |
| 6,439,327 B1* | 8/2002 | Griffin | E21B 10/573 175/433 |
| 7,108,598 B1* | 9/2006 | Galloway | E21B 10/5735 175/428 |
| 7,842,111 B1 | 11/2010 | Sani | |
| 2006/0266559 A1* | 11/2006 | Keshavan | B01J 3/062 175/428 |
| 2007/0020403 A1 | 1/2007 | Yoshitake et al. | |

(Continued)

OTHER PUBLICATIONS

Sumiya et al., "Indentation hardness of nano-polycrystalline diamond prepared from graphite by direct conversion", Diamond & Related Materials 13 (2004) 1771-1776.*

(Continued)

*Primary Examiner* — Pegah Parvini
(74) *Attorney, Agent, or Firm* — Dorsey & Whitney LLC

(57) ABSTRACT

Embodiments of the invention relate to polycrystalline diamond compacts ("PDC") exhibiting enhanced diamond-to-diamond bonding. In an embodiment, PDC includes a sintered substantially single-phase polycrystalline diamond ("PCD") body consisting essentially of bonded-together diamond grains exhibiting a morphology different than that of a PCD body formed by sintering diamond crystals. A substrate is bonded to the sintered substantially single-phase PCD body. Other embodiments are directed to methods of forming such PDCs, and various applications for such PDCs in rotary drill bits, bearing apparatuses, and wire-drawing dies.

20 Claims, 18 Drawing Sheets

(56) References Cited

U.S. PATENT DOCUMENTS

| | | |
|---|---|---|
| 2008/0022806 A1 | 1/2008 | Sumiya |
| 2008/0179109 A1* | 7/2008 | Belnap .................. B22F 7/06 |
| | | 175/432 |
| 2008/0185189 A1* | 8/2008 | Griffo .................. B01J 3/062 |
| | | 175/433 |
| 2009/0095538 A1 | 4/2009 | Middlemiss |
| 2009/0273224 A1 | 11/2009 | Hall |
| 2009/0305039 A1 | 12/2009 | Sumiya |
| 2010/0083583 A1 | 4/2010 | Sumiya et al. |
| 2010/0146865 A1 | 6/2010 | Sato et al. |

OTHER PUBLICATIONS

U.S. Appl. No. 11/545,929, filed Oct. 10, 2006, Bertagnolli et al.
U.S. Appl. No. 12/608,155, filed Oct. 29, 2009, Sani et al.
U.S. Appl. No. 13/166,007, filed Jun. 22, 2011, Chapman et al.
U.S. Appl. No. 13/397,977, filed Feb. 16, 2012, Bertagnolli et al.
Decker, et al., "High-Pressure Calibration: A Critical Review," J. Phys. Chem. Ref. Data, vol. 1, pp. 1-79, (1972).
Irifune et al., "Ultrahard Polycrystalline Diamond From Graphite", Nature, vol. 421, pp. 599-600 (Feb. 6, 2003).
Rousse, et al. "Structure of the Intermediate Phase of PbTe at High Pressure," Physical Review B, vol. 71, 224116-1-224116-6, (2005).
Sumiya et al., "Microstructure Features of Polycrystalline Diamond Synthesized Directly from Graphite Under Static High Pressures", Jounral of Science Materials Science, vol. 39, pp. 445-450, (2004).
Sumiya et al., "Conditions and Mechanism of Formation of Nano-Polycrystalline Diamonds on Direct Transformation from Graphite and Non-Graphitic Carbon at High Pressure and Temperature", High Pressure Research, vol. 26, pp. 63-69 (Jun. 2006).
Sumiya et al., "Hardness and Deformation Microstructures of Nano-Polycrystalline Diamonds Synthesized from Various Carbons Under High Pressure and High Temperature", J. Mater. Res., vol. 22, pp. 2345-2351 (Aug. 2007).
Sumiya et al., "Microstructure and Mechanical Properties of High-Hardness Nano-Polycrystalline Diamonds", SEI Technical Review No. 66, pp. 85-92 (Apr. 2008).
U.S. Appl. No. 13/397,977, filed Sep. 9, 2014, Office Action.
U.S. Appl. No. 13/397,977, filed Dec. 31, 2014, Office Action.
U.S. Appl. No. 13/397,977, filed Jun. 12, 2015, Notice of Allowance.
U.S. Appl. No. 13/397,977, filed Jul. 13, 2015, Notice of Allowance.
U.S. Appl. No. 13/397,977, filed Oct. 1, 2015, Notice of Allowance.
U.S. Appl. No. 13/397,977, filed Jan. 20, 2016, Issue Notification.

* cited by examiner

POLYCRYSTALLINE DIAMOND COMPACT INCLUDING SUBSTANTIALLY SINGLE-PHASE POLYCRYSTALLINE DIAMOND BODY AND APPLICATIONS THEREFOR

CROSS-REFERENCE TO RELATED APPLICATIONS

This application is a division of U.S. application Ser. No. 13/397,977 filed on 16 Feb. 2012, the disclosure of which is incorporated herein, in its entirety, by this reference.

BACKGROUND

Wear-resistant, superabrasive compacts are utilized in a variety of mechanical applications. For example, polycrystalline diamond compacts ("PDCs") are used in drilling tools (e.g., cutting elements, gage trimmers, etc.), machining equipment, bearing apparatuses, wire-drawing machinery, and in other mechanical apparatuses.

PDCs have found particular utility as superabrasive cutting elements in rotary drill bits, such as roller-cone drill bits and fixed-cutter drill bits. A PDC cutting element typically includes a superabrasive diamond layer commonly referred to as a diamond table. The diamond table may be formed and bonded to a substrate using a high-pressure, high-temperature ("HPHT") process. The PDC cutting element may also be brazed directly into a preformed pocket, socket, or other receptacle formed in the bit body. The substrate may often be brazed or otherwise joined to an attachment member, such as a cylindrical backing. A rotary drill bit typically includes a number of PDC cutting elements affixed to the bit body. It is also known that a stud carrying the PDC may be used as a PDC cutting element when mounted to a bit body of a rotary drill bit by press-fitting, brazing, or otherwise securing the stud into a receptacle formed in the bit body.

Conventional PDCs are normally fabricated by placing a substrate into a container with a volume of diamond particles positioned adjacent to the cemented carbide substrate. A number of such cartridges may be loaded into an HPHT press. The substrates and volume of diamond particles are then processed under HPHT conditions in the presence of a catalyst material that causes the diamond particles to bond to one another to form a matrix of bonded diamond grains defining a polycrystalline diamond ("PCD") table that is bonded to the substrate. The catalyst material is often a metal-solvent catalyst (e.g., cobalt, nickel, iron, or alloys thereof) that is used for promoting intergrowth of the diamond particles.

In one conventional approach, a constituent of the cemented carbide substrate, such as cobalt from a cobalt-cemented tungsten carbide substrate, liquefies and sweeps from a region adjacent to the volume of diamond particles into interstitial regions between the diamond particles during the HPHT process. The cobalt acts as a catalyst to promote intergrowth between the diamond particles, which results in formation of bonded diamond grains. Often, a solvent catalyst may be mixed with the diamond particles prior to subjecting the diamond particles and substrate to the HPHT process.

The presence of the solvent catalyst in the PCD table is believed to reduce the thermal stability of the PCD table at elevated temperatures. For example, the difference in thermal expansion coefficient between the diamond grains and the solvent catalyst is believed to lead to chipping or cracking of the PCD table during drilling or cutting operations, which can degrade the mechanical properties of the PCD table or cause failure. Additionally, some of the diamond grains can undergo a chemical breakdown or back-conversion to graphite via interaction with the solvent catalyst. At elevated high temperatures, portions of the diamond grains may transform to carbon monoxide, carbon dioxide, graphite, or combinations thereof, thus degrading the mechanical properties of the PDC.

One conventional approach for improving the thermal stability of a PDC is to at least partially remove the solvent catalyst from the PCD table of the PDC by acid leaching. However, removing the solvent catalyst from the PCD table can be relatively time consuming for high-volume manufacturing. Additionally, depleting the solvent catalyst may decrease the mechanical strength of the PCD table.

Despite the availability of a number of different PDCs, manufacturers and users of PDCs continue to seek PDCs that exhibit improved mechanical and/or thermal properties.

SUMMARY

Embodiments of the invention relate to PDCs, methods of fabricating PDCs, and applications for such PDCs. The sintered substantially single-phase PCD body has excellent thermal stability and wear resistance due to essentially the complete absence of metal-solvent catalyst therein. In an embodiment, a PDC includes a sintered substantially single-phase PCD body consisting essentially of bonded-together diamond grains exhibiting a morphology different than that of a PCD body formed by sintering diamond crystals. The PDC further includes a substrate bonded to the sintered substantially single-phase PCD body.

In another embodiment, a method of fabricating a PDC is disclosed. The method includes forming a sintered substantially single-phase PCD body. The method further includes bonding the sintered substantially single-phase PCD body to a substrate.

In yet another embodiment, a method of integrally forming and bonding a sintered substantially single-phase PCD body to a substrate is disclosed. The method includes forming an assembly including at least one layer of non-diamond carbon, a substrate, and two or more layers of diamond and/or non-diamond carbon particles having different respective average particle sizes positioned between the at least one layer of non-diamond carbon and the substrate. The method further includes subjecting the assembly to an HPHT process effective to form and bond the sintered substantially single-phase PCD body to the substrate via an intermediate PCD region. During the HPHT process, the sintered substantially single-phase PCD body is formed at least partially from the at least one layer of non-diamond carbon and the intermediate polycrystalline diamond region is formed at least partially from the two or more layers of diamond and/or non-diamond carbon particles.

Further embodiments relate to applications utilizing the disclosed PCD and PDCs in various articles and apparatuses, such as rotary drill bits, bearing apparatuses, wire-drawing dies, machining equipment, and other articles and apparatuses.

Features from any of the disclosed embodiments may be used in combination with one another, without limitation. In addition, other features and advantages of the present disclosure will become apparent to those of ordinary skill in the

DETAILED DESCRIPTION

Embodiments of the invention relate to a sintered substantially single-phase PCD body that is directly converted from non-diamond carbon under HPHT conditions and bonded to a substrate to form a PDC. Non-diamond carbon includes, but is not limited to, graphitic carbon (e.g., graphite), amorphous carbon, other $sp^2$-type carbon (e.g., fullerenes and/or graphene), or combinations thereof. The sintered substantially single-phase PCD body has excellent thermal stability and wear resistance due to very low concentrations of metal-solvent catalyst therein, substantially the complete absence of metal-solvent catalyst therein, or essentially the complete absence of metal-solvent catalyst therein. Embodiments also relate to methods of fabricating such PDCs, and applications for such PDCs in rotary drill bits, bearing apparatuses, wire-drawing dies, machining equipment, and other articles and apparatuses.

Figure 1:
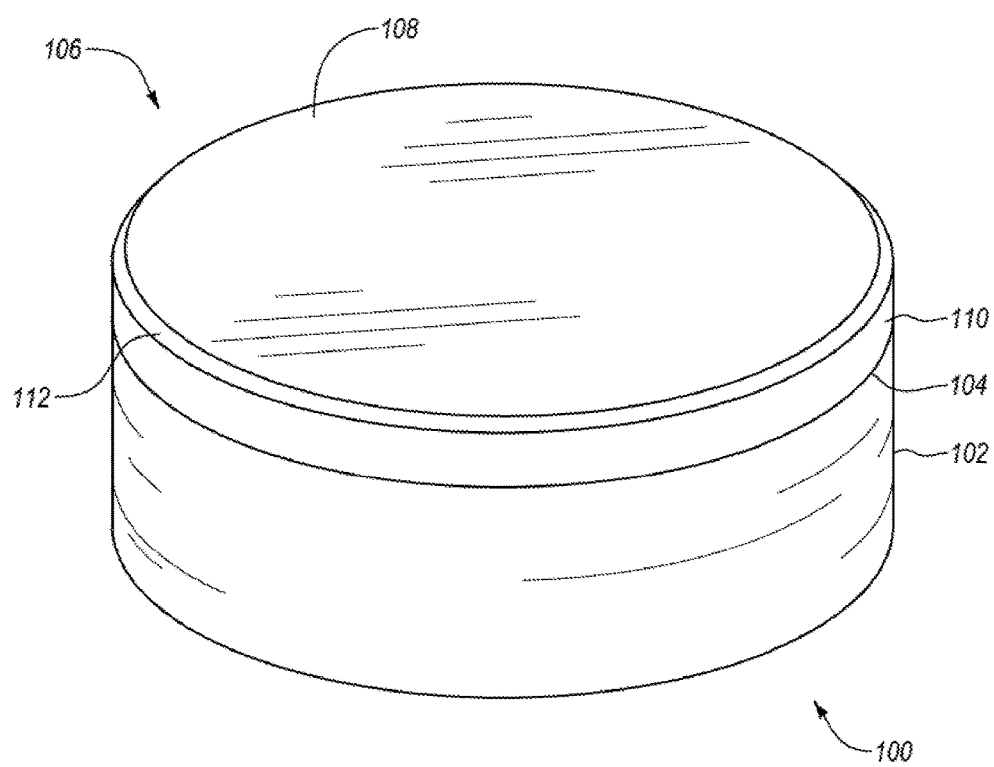
FIG. 1 is an isometric view of an embodiment of a PDC.
Figure 2:
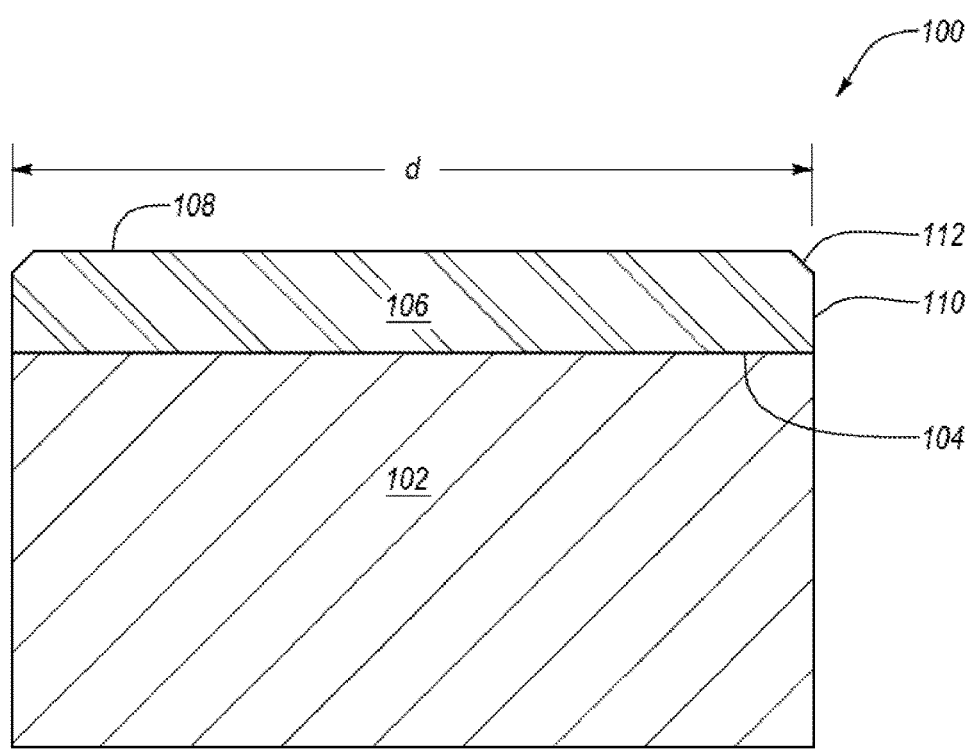
FIG. 2 is a cross-sectional view of the PDC shown in FIG. 1.

FIGS. 1 and 2 are isometric and cross-sectional views, respectively, of a PDC 100 according to an embodiment. The PDC 100 includes a substrate 102 including at least tungsten carbide grains cemented together with a metallic cementing constituent, such as iron, nickel, cobalt, or alloys thereof. The substrate 102 includes an interfacial surface 104. In the illustrated embodiment, the interfacial surface 104 is substantially planar. However, in other embodiments, the interfacial surface 104 may exhibit a nonplanar topography.

The substrate 102 may include, without limitation, cemented carbides, such as tungsten carbide, titanium carbide, chromium carbide, niobium carbide, tantalum carbide, vanadium carbide, or combinations thereof cemented together with iron, nickel, cobalt, or alloys thereof. For example, in an embodiment, the substrate 102 comprises cobalt-cemented tungsten carbide.

The PDC 100 further includes a sintered substantially single-phase PCD body 106 bonded to the interfacial surface 104 of the substrate 102. The sintered substantially single-phase PCD body 106 consists essentially of directly bonded-together diamond grains exhibiting diamond-to-diamond bonding therebetween (e.g., $sp^3$ bonding). In other words, the single phase present in the sintered substantially single-phase PCD body 106 is the $sp^3$ diamond phase. For example, the sintered substantially single-phase PCD body 106 is substantially free of metal-solvent catalyst.

As will be discussed in more detail below, the sintered substantially single-phase PCD body 106 is formed from the conversion of non-diamond, such as graphite particles, amorphous carbon (e.g., lamp black), a substantially pure polycrystalline graphite rod and/or cylinder, other suitable non-diamond carbon, or combinations thereof to directly-bonded together diamond grains during an HPHT sintering process. The morphology and structure of the directly-bonded together diamond grains of the sintered substantially single-phase PCD body 106 is different from a PCD body formed from sintering diamond crystals with or without employing a catalyst material. For example, the directly-bonded together diamond grains may exhibit very fine, randomly oriented granular grains as opposed to more equiaxed diamond grains commonly observed in a PCD body formed from sintering diamond crystals. For example, the sintered substantially single-phase PCD body 106 may include randomly oriented granular diamond grains exhibiting a size range of about 5 nm to about 40 nm, about 5 nm to about 30 nm, about 10 nm to about 40 nm, about 10 nm to about 30 nm, or about 10 nm to about 20 nm. Other chemical and/or structural characteristics of the sintered substantially single-phase PCD body 106 that differ from that of a PCD body formed from sintering diamond crystals is the presence of residual amounts of unconverted non-diamond carbon and/or other residual amounts of $sp^2$-carbon materials. For example, the sintered substantially single-phase PCD body 106 may include residual amounts of non-diamond carbon and/or other residual amounts of $sp^2$-carbon materials in an amount of about 0 to about 1 weight ("wt %") non-diamond carbon, such as about 0.1 wt % to about 0.7 wt %, about 0.1 wt % to about 0.5 wt %, about 0.2 wt % to about 0.4 wt %, or about 0.15 wt % to about 0.25 wt %.

Further structural differences between of the sintered substantially single-phase PCD body 106 that may differ from that of a PCD body formed from sintering diamond crystals is a greater thermal stability and a greater $G_{ratio}$ due to the lack of any metal-solvent catalyst, such as cobalt, iron, nickel, or alloys thereof. For example, the $G_{ratio}$ may be at least about $5.0 \times 10^6$, such as about $6.0 \times 10^6$ to about $15.0 \times 10^6$, or about $8.0 \times 10^6$ to about $13.0 \times 10^6$. In some embodiments, the $G_{ratio}$ may be at least about $20.0 \times 10^6$, such as about $25.0 \times 10^6$ to about $35.0 \times 10^6$. The foregoing $G_{ratio}$ values are significantly greater than that of a non-sintered PCD body formed from chemical vapor deposition. The $G_{ratio}$ is the ratio of the volume of workpiece cut to the volume of PCD body worn away during the cutting process. An example of suitable parameters that may be used to determine a $G_{ratio}$ of the PCD body are a depth of cut for the PCD cutting element of about 0.254 mm, a back rake angle for the PCD cutting element of about 20 degrees, an in-feed for the PCD cutting element of about 6.35 mm/rev, a rotary speed of the workpiece to be cut of about 101 rpm, and the workpiece may be made from Barre granite having a 914 mm outer diameter and a 254 mm inner diameter. During the $G_{ratio}$ test, the workpiece may be cooled with a coolant, such as water.

Increased thermal stability of the sintered substantially single-phase PCD body 106 may also be observed using a dry vertical turret lathe test. The dry vertical turret lathe test measures the thermal stability of a PCD body by measuring the distance cut in a Barre granite workpiece prior to failure, without using coolant. The "distance cut" in this test is considered representative of the thermal stability of a PCD body. An example of test parameters suitable to determine the distance cut are a depth of cut for the PDC of about 1.27 mm, a back rake angle for the PDC of about 20 degrees, an in-feed for the PDC of about 1.524 mm/rev, and a cutting speed of the workpiece to be cut of about 1.78 m/sec. Distance cut values for the sintered substantially single-phase PCD body 106 may be significantly greater than that of a non-sintered PCD body formed from chemical vapor deposition.

In an embodiment, the sintered substantially single-phase PCD body 106 may be integrally formed with (e.g., formed from graphite powder, rod, or cylinder, or other non-diamond carbon material and sintered on) the substrate 102. In another embodiment, the sintered substantially single-phase PCD body 106 may be a preformed sintered substantially single-phase PCD body (i.e., "freestanding") that is bonded to the substrate 102 in an HPHT bonding process. In another embodiment, a preformed (i.e., "freestanding") sintered substantially single-phase PCD body 106 is directly brazed to the interfacial surface 104 of the substrate 102. In yet another embodiment, the sintered substantially single-phase PCD body 106 has an interfacial surface that is ablated to form pores therein that is infiltrated with an infiltrant from the substrate 102 during an HPHT bonding process.

Referring still FIGS. 1 and 2, the sintered substantially single-phase PCD body 106 includes a working upper surface 108, at least one lateral surface 110, and an optional chamfer 112 extending there between. However, it is noted that all or part of the at least one lateral surface 110 and/or the chamfer 112 may also function as a working surface. In the illustrated embodiment, the PDC 100 has a cylindrical geometry, and the upper surface 108 exhibits a substantially planar geometry. However, in other embodiments, the PDC 100 may exhibit a non-cylindrical geometry and/or the upper surface 108 of the sintered substantially single-phase PCD body 106 may be nonplanar, such as convex or concave.

The sintered substantially single-phase PCD body 106 or its precursor may be directly converted from non-diamond carbon, such as a plurality of graphite particles, amorphous carbon, a substantially pure polycrystalline graphite rod and/or cylinder, other suitable non-diamond carbon material, or combinations thereof during an HPHT process under diamond-stable conditions. According to various embodiments, the graphite and/or graphite particles may be crystalline graphite particles, amorphous graphite particles, synthetic graphite particles, carbon-12 graphite, carbon-13 graphite, carbon-14 graphite, substantially pure polycrystalline graphite, or combinations thereof. Amorphous graphite refers to naturally occurring microcrystalline graphite. Crystalline graphite particles may be naturally occurring or synthetic. Various types of graphite particles are commercially available from Ashbury Graphite Mills of Kittanning, Pa.

In an embodiment, the non-diamond carbon (in any form such as graphite, amorphous carbon, etc.) may be made substantially of only one of carbon-12, carbon-13, or carbon-14. For example, in an embodiment, the non-diamond carbon may be made of about 99.00 weight % carbon-12 to less than about 100 weight % carbon-12, or about 99.00 weight % carbon-12 to about 99.99 weight % carbon-12, or about 99.50 weight % carbon-12 to about 99.99 weight % carbon-12, or about 99.30 weight % carbon-12 to about 99.99 weight % carbon-12, about 99.30 weight % carbon-12 to about 99.50 weight % carbon-12, or about 99.80 weight % carbon-12 to about 99.99 weight % carbon-12, with the balance being carbon-13 and/or carbon-14. In some embodiments, the carbon-13 and/or carbon-14 may be present in combination with the carbon-12 in an amount less than that may naturally occur in combination with carbon-12.

In another embodiment, the non-diamond carbon (in any form such as graphite, amorphous carbon, etc.) may be made of about 99.00 weight % carbon-13 to less than about 100 weight % carbon-13, or about 99.00 weight % carbon-13 to about 99.99 weight % carbon-13, or about 99.50 weight % carbon-13 to about 99.99 weight % carbon-13, or about 99.30 weight % carbon-13 to about 99.99 weight % carbon-13, about 99.30 weight % carbon-13 to about 99.50 weight % carbon-13, or about 99.80 weight % carbon-13 to about 99.99 weight % carbon-13, with the balance being carbon-12 and/or carbon-14. In some embodiments, the carbon-12 and/or carbon-14 may be present in combination with the carbon-13 in an amount less than that may naturally occur in combination with carbon-13.

In another embodiment, the non-diamond carbon (in any form such as graphite, amorphous carbon, etc.) may be made of about 99.00 weight % carbon-14 to less than about 100 weight % carbon-14, or about 99.00 weight % carbon-14 to about 99.99 weight % carbon-14, or about 99.50 weight % carbon-14 to about 99.99 weight % carbon-14, or about 99.30 weight % carbon-14 to about 99.99 weight % carbon-14, about 99.30 weight % carbon-14 to about 99.50 weight % carbon-14, or about 99.80 weight % carbon-14 to about 99.99 weight % carbon-14, with the balance being carbon-12 and/or carbon-13. In some embodiments, the carbon-12 and/or carbon-13 may be present in combination with the carbon-14 in an amount less than that may naturally occur in combination with carbon-14.

It should be noted that substantially all of the non-diamond carbon may be converted to diamond during HPHT processing to form the sintered substantially single-phase PCD body 106. However, the particular carbon isotopes may remain in the sintered substantially single-phase PCD body 106 in approximately the same or similar ratio as present in the non-diamond carbon before HPHT processing, but now in the form of diamond. For example, the carbon present in the sintered substantially single-phase PCD body 106 as diamond may be substantially only one of carbon-12, carbon-13, or carbon-14 (i.e., the dominant carbon isotope), with the balance of any carbon being the other one(s) of carbon-12, carbon-13, or carbon-14 in an amount less than that may naturally occur in combination with the dominant carbon isotope present in the sintered substantially single-phase PCD body 106.

Referring to FIGS. 1 and 2, the sintered substantially single-phase PCD body 106, directly converted from non-diamond carbon (e.g., a mass of a plurality of graphite particles) during an HPHT process under diamond-stable conditions, has excellent thermal stability due to the substantially complete absence of metal-solvent catalyst therein. In an embodiment, a plurality of graphite particles to be converted may exhibit an average particle size of about 50 μm or less, such as about 30 μm or less, about 20 μm or less, about 1 μm to about 2 μm, about 1 to about 10 μm, about 10 μm to about 18 μm, or about 15 μm to about 18 μm. In some embodiments, the average particle size of the graphite particles may be about 10 μm or less, such as about 2 μm to about 5 μm or submicron. In an embodiment, a pure polycrystalline graphite rod and/or cylinder to be converted may consist essentially of about 1 μm to about 2 μm randomly oriented graphite grains.

In one or more embodiments, the plurality of graphite or other non-diamond carbon particles may comprise a relatively larger size and at least one relatively smaller size. As used herein, the phrases "relatively larger" and "relatively smaller" refer to particle sizes (by any suitable method) that differ by at least a factor of two (e.g., 30 μm and 15 μm). More particularly, in various embodiments, the plurality of graphite particles may include a portion exhibiting a relatively larger size (e.g., 100 μm, 90 μm, 80 μm, 70 μm, 60 μm, 50 μm, 40 μm, 30 μm, 20 μm, 15 μm, 12 μm, 10 μm, 8 μm) and another portion exhibiting at least one relatively smaller size (e.g., 30 μm, 20 μm, 10 μm, 15 μm, 12 μm, 10 μm, 8 μm, 4 μm, 2 μm, 1 μm, 0.5 μm, less than 0.5 μm, 0.1 μm, less than 0.1 μm). In an embodiment, the plurality of graphite particles may include a portion exhibiting a relatively larger size between about 40 μm and about 15 μm and another portion exhibiting a relatively smaller size between about 12 μm and 2 μm. The plurality of graphite particles may also include three or more different sizes (e.g., one relatively larger size and two or more relatively smaller sizes) without limitation.

It is noted that the as-sintered diamond grain size of the sintered substantially single-phase PCD body 106 may differ from the average particle size of the non-diamond carbon particles prior to sintering due to a variety of different physical processes, such as grain growth, graphite particles fracturing, carbon provided from another carbon source, or combinations of the foregoing.

In order to efficiently sinter the non-diamond carbon (e.g., the mass of graphite particles, rod, or cylinder) and form the sintered substantially single-phase PCD body 106 (either integrally with the substrate 102 or as a preformed PCD body to be subsequently attached to the substrate 102), the non-diamond carbon may be enclosed in a pressure transmitting medium, such as a refractory metal can, graphite structure, pyrophyllite, combinations thereof, or other suitable pressure transmitting structure to form a cell assembly. Examples of suitable gasket materials and cell structures for use in manufacturing PCD are disclosed in U.S. Pat. No. 6,338,754 and U.S. patent application Ser. No. 11/545,929, each of which is incorporated herein, in its entirety, by this reference. Another example of a suitable pressure transmitting material is pyrophyllite, which is commercially available from Wonderstone Ltd. of South Africa. The cell assembly, including the pressure transmitting medium and mass of graphite particles, rod, or cylinder therein (at a minimum), is subjected to an HPHT process using an ultra-high pressure press at a temperature of at least about 2000° C. (e.g., about 2000° C. to about 2200° C., about 2200° C. to about 2600° C., or about 2300° C. to about 2500° C. preferably) and a pressure in the pressure transmitting medium of at least about 10 GPa (e.g., about 10 GPa to about 15 GPa, or about 12 GPa to about 25 GPa) for a time sufficient to directly convert the graphite particles, rod, or cylinder into the sintered substantially single-phase PCD body 106 comprising directly bonded-together diamond grains. For example, the pressure in the pressure transmitting medium employed in the HPHT process may be at least about 8.0 GPa, at least about 9.0 GPa, at least about 10.0 GPa, at least about 11.0 GPa, at least about 12.0 GPa, or at least about 14 GPa.

The pressure values employed in the HPHT processes disclosed herein refer to the pressure in the pressure transmitting medium at room temperature (e.g., about 25° C.) with application of pressure using an ultra-high pressure press and not the pressure applied to the exterior of the cell assembly. The actual pressure in the pressure transmitting medium at sintering temperature may be higher. The ultra-high pressure press may be calibrated at room temperature by embedding at least one calibration material that changes structure at a known pressure, such as PbTe, thallium, barium, or bismuth in the pressure transmitting medium. Further, optionally, a change in resistance may be measured across the at least one calibration material due to a phase change thereof. For example, PbTe exhibits a phase change at room temperature at about 6.0 GPa and bismuth exhibits a phase change at room temperature at about 7.7 GPa. Examples of suitable pressure calibration techniques are disclosed in G. Rousse, S. Klotz, A. M. Saitta, J. Rodriguez-Carvajal, M. I. McMahon, B. Couzinet, and M. Mezouar, "Structure of the Intermediate Phase of PbTe at High Pressure," Physical Review B: Condensed Matter and Materials Physics, 71, 224116 (2005) and D. L. Decker, W. A. Bassett, L. Merrill, H. T. Hall, and J. D. Barnett, "High-Pressure Calibration: A Critical Review," J. Phys. Chem. Ref. Data, 1, 3 (1972).

Figure 5B:
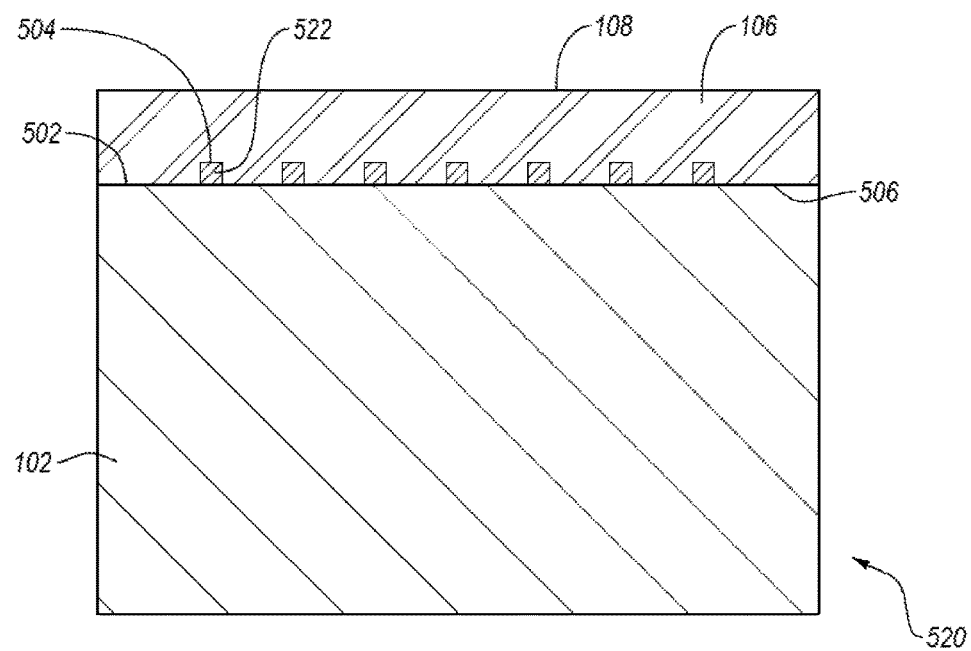
FIG. 5B is a cross-sectional view of an embodiment of a PDC formed by HPHT processing of the PDC precursor assembly shown in FIG. 5A, which illustrates the presence of a metallic infiltrant filling the recesses in the interfacial surface of the sintered substantially single-phase PCD body shown in FIG. 5A.
Figure 6B:
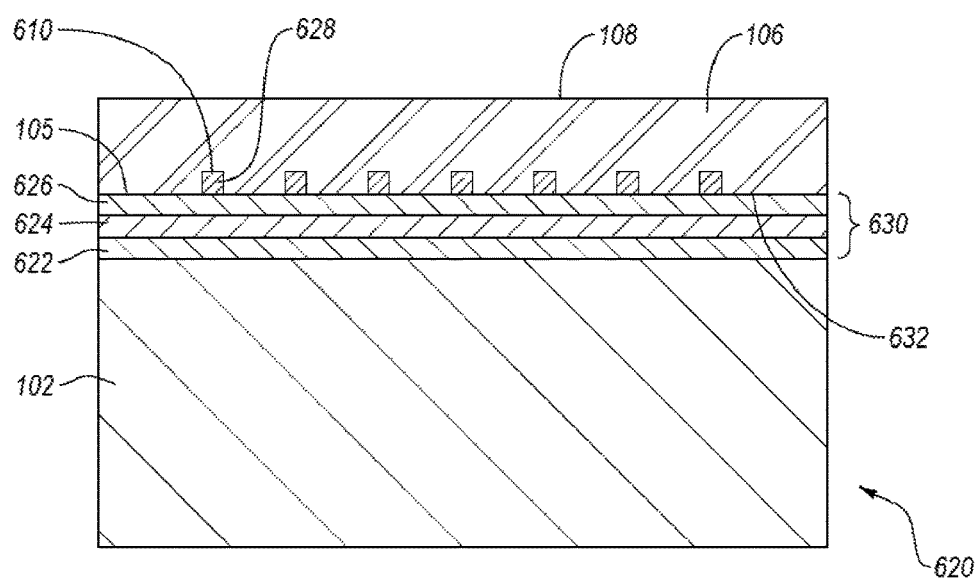
FIG. 6B illustrates a cross-sectional view of a PDC formed by HPHT processing of the PDC precursor assembly shown in FIG. 6A, which illustrates the presence of metallic infiltrant filling the recesses of the preformed sintered substantially single-phase PCD body shown in FIG. 6A.
Figure 7:
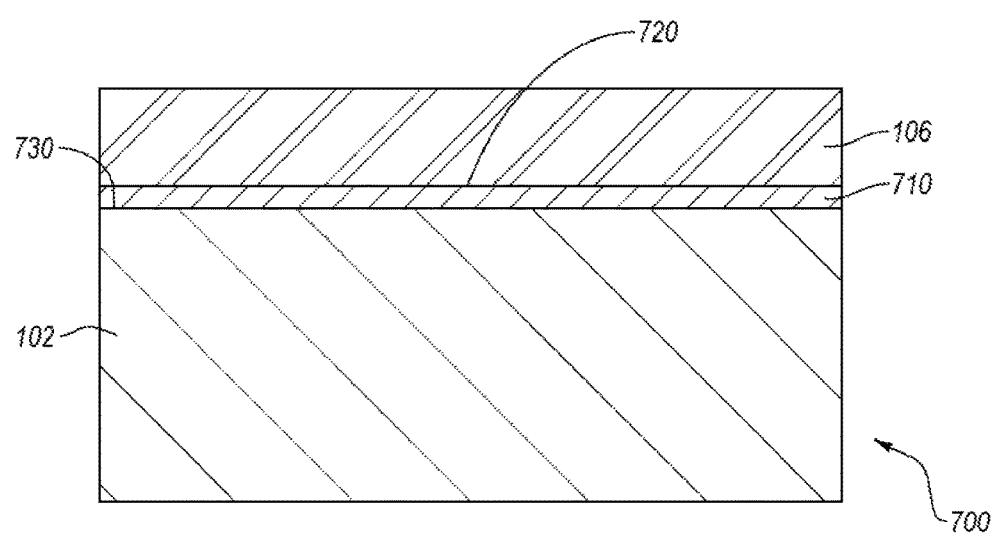
FIG. 7 is a cross-sectional view of an embodiment of a PDC in which a preformed sintered substantially single-phase PCD body is directly brazed onto a substrate.

The sintered substantially single-phase PCD body 106 may be bonded to the substrate 102 by a number of different techniques. For example, referring to FIGS. 3A-4B, in one or more embodiments, the sintered substantially single-phase PCD body 106 may be integrally formed (i.e., formed from graphite powder, rod, or cylinder and bonded) to an intermediate PCD region 330 and the substrate 102. In another embodiment, the sintered substantially single-phase PCD body 106 may be a preformed sintered substantially single-phase PCD body (i.e., "freestanding") that is laser ablated to form a porous interfacial surface that is then placed adjacent to a substrate and subjected to an HPHT process under diamond-stable conditions to bond the sintered substantially single-phase PCD body to the substrate 102 (as shown in FIG. 5B). In a similar embodiment, the laser ablated porous interface of the sintered substantially single-phase PCD body 106 may be bonded to the substrate 102 via an intermediate PCD region during an HPHT process (as shown in FIG. 6B). In yet another embodiment, the sintered substantially single-phase PCD body 106 may be brazed to the substrate 102 (as shown in FIG. 7) via a braze material that is placed between the sintered substantially single-phase PCD body 106 and the substrate 102.

Figure 8A:
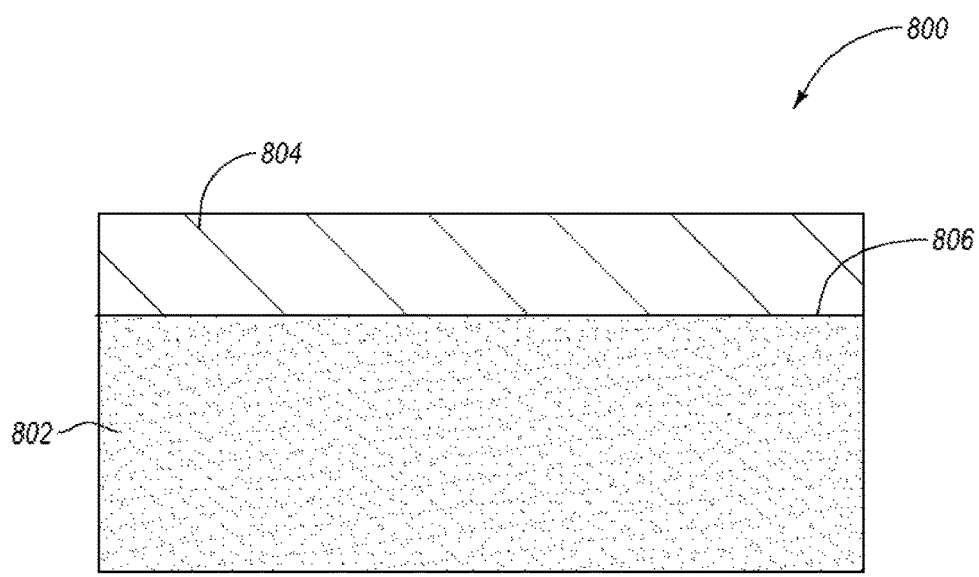
FIGS. 8A-8D are cross-sectional views illustrating different stages in various embodiments of a method for fabricating a PDC and the PDC so formed.
Figure 8B:
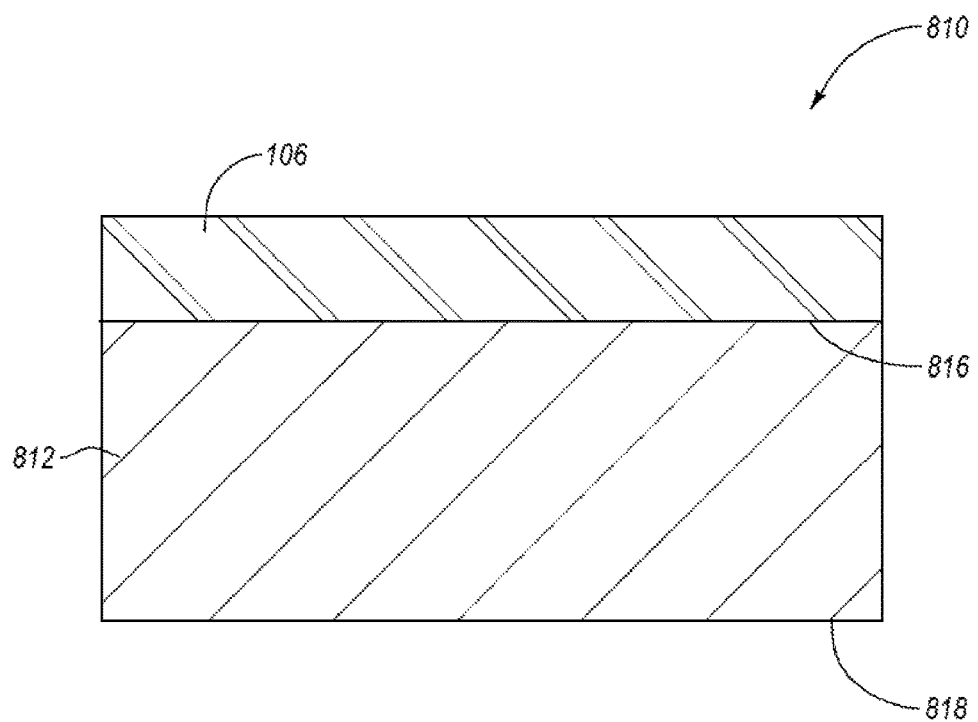
Figure 8C:
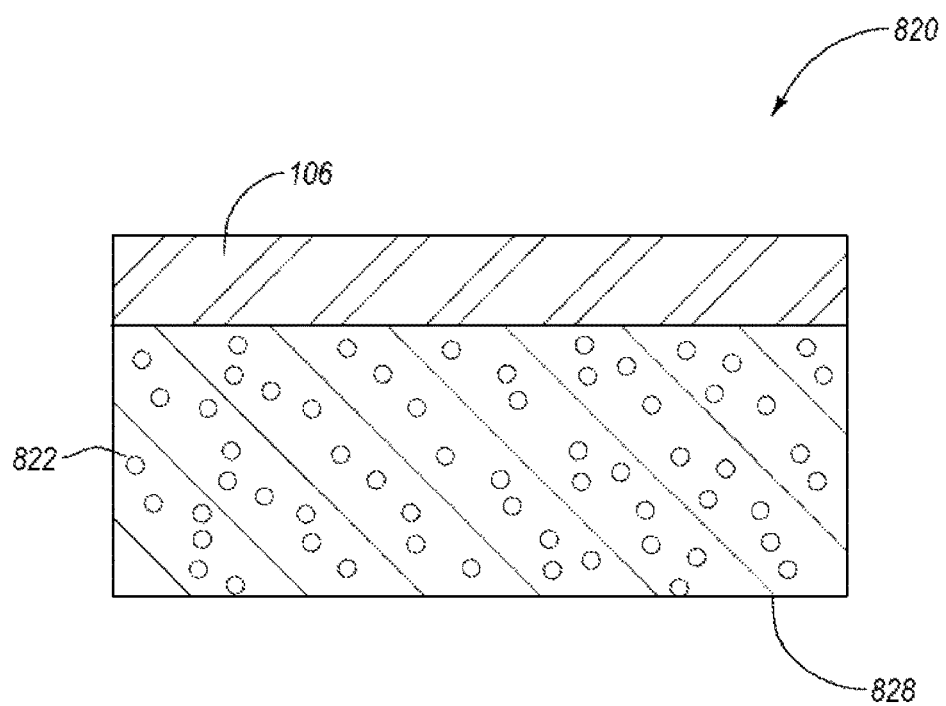
Figure 8D:
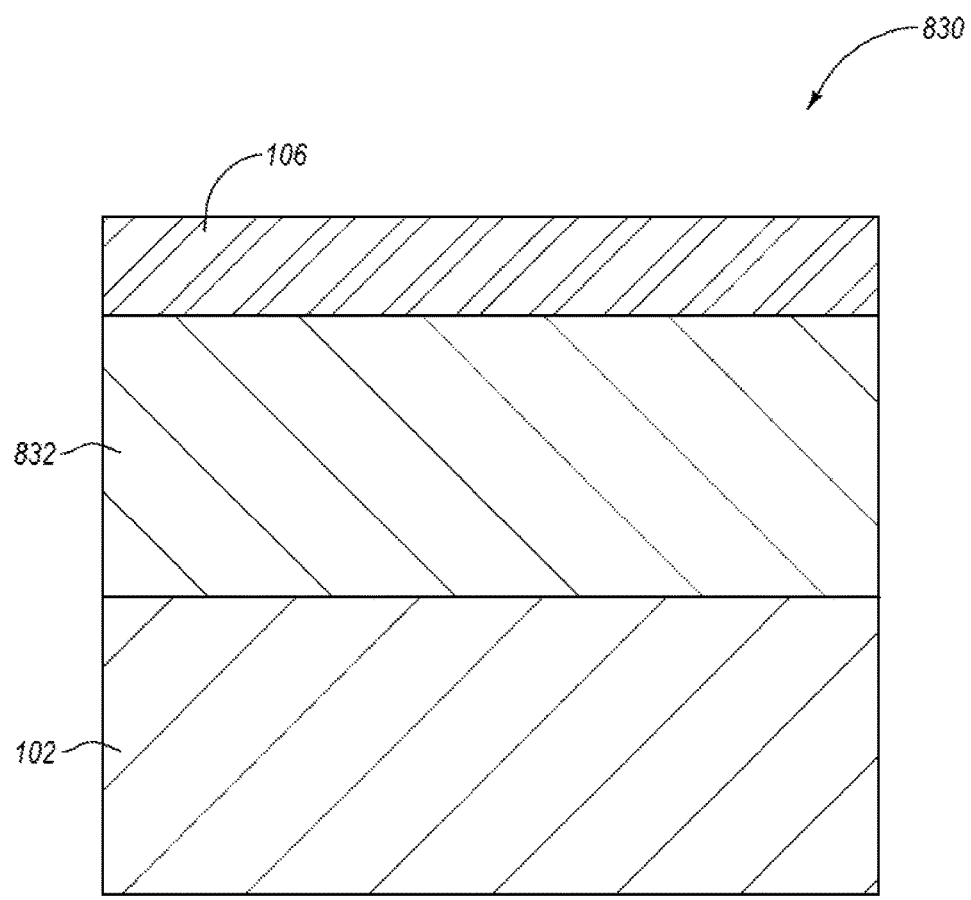

In a further embodiment, the sintered substantially single-phase PCD body 106 may be formed by creating an assembly including a mass of non-diamond carbon (e.g., a plurality of graphite and/or amorphous carbon particles) positioned adjacent to a mixture of a plurality of graphite particles and/or other non-diamond carbon particles and a plurality of sacrificial particles (as shown in FIG. 8A). The assembly is subjected to HPHT processing to form the sintered substantially single-phase PCD body 106 bonded to a PCD region 822 (as shown in FIG. 8B) that is subsequently leached to at least partially remove the sacrificial particles (as shown in FIG. 8C). This PCD structure comprised of the sintered substantially single-phase PCD body 106 bonded to the at least partially leached PCD region 822 is then bonded to the substrate via a second HPHT process (as shown in FIG. 8D). In another similar embodiment, the PCD structure comprised of the sintered substantially single-phase PCD body 106 bonded to the at least partially leached PCD region 822 may be bonded to the substrate 102 by brazing the at least partially leached PCD region 822 to the substrate 102 via a braze material placed between the at least partially leached PCD region 822 and the substrate 102.

Figure 3A:
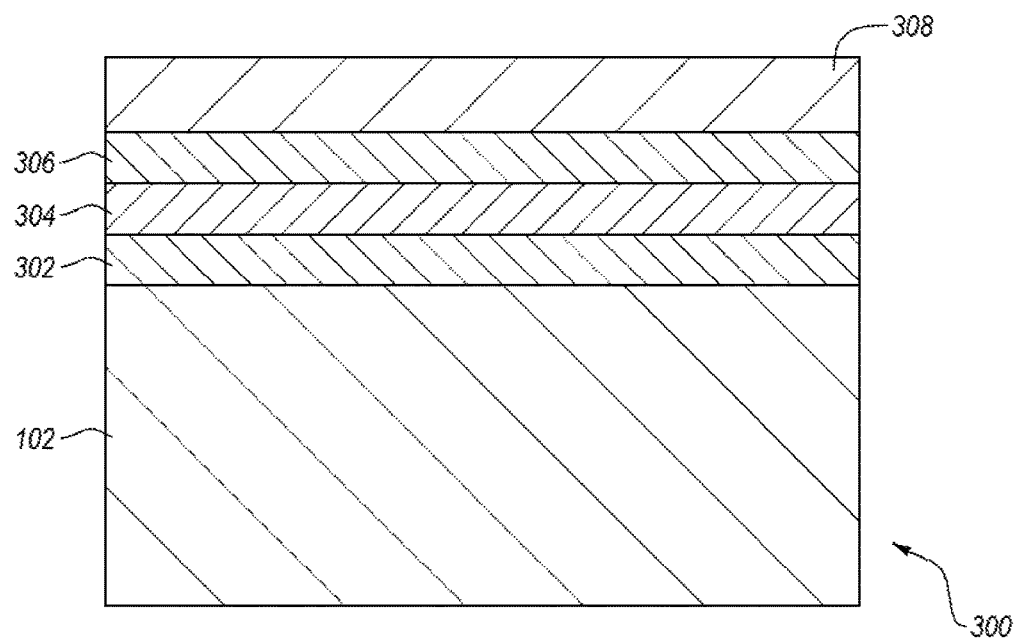
FIG. 3A is a cross-sectional view of an embodiment of a PDC precursor assembly including a plurality of layers of diamond particles having different respective average particle sizes positioned between a mass of non-diamond carbon and a substrate.

FIG. 3A is a cross-sectional view of an embodiment of a PDC precursor assembly 300 for integrally forming the sintered substantially single-phase PCD body 106 (FIG. 3B) with the substrate 102. Generally, the precursor assembly may include a substrate, one or more layers of non-diamond carbon (e.g., graphite and/or amorphous carbon particles), and one or more layers of diamond particles. In an embodiment, the PDC precursor assembly 300 includes the substrate 102, at least one layer of non-diamond carbon 308 (e.g., any of the graphite particles and/or amorphous carbon disclosed herein), and a plurality of layers of diamond particles 302, 304, and 306 disposed between the mass of the plurality of graphite particles 308 and the substrate 102. The plurality of layers of diamond particles 302, 304, and 306, respectively have different properties, compositions, average particle sizes, or combinations thereof. Although the illustrated embodiment shows three layers, two or more layers of diamond particles or more than three layers of diamond particles may be employed. In an embodiment, the average particle size increases from the layer 302 to the layer 306, with a fine-sized average particle size in the layer 302, a medium-sized average particle size in the layer 304, and a coarse-sized average particle size in the layer 306.

In some embodiments, the coarse-sized average particle size in the layer 306 is about 2 times that of the medium-sized average particle size in the layer 304, and the coarse-sized average particle size is about 5 times that of the fine-sized average particle size in the layer 302. As used herein, the phrases "coarse-sized," "medium-sized," and "fine-sized" refer to particle sizes in which the coarse-sized particle size is about 2 times that of the medium-sized particle size, and the coarse-sized particle size is about 5 times that of the fine-sized average particle size (e.g., 100 µm, 50 µm, and 20 µm). According to various embodiments, the layers of diamond and/or non-diamond carbon particles may include a portion exhibiting a coarse-sized average particle size (e.g., 10 µm, 50 µm, 100 µm, 150 µm, 200 µm), a medium-sized average particle size (e.g., 5 µm, 25 µm, 50 µm, 75 µm, 100 µm), and another layer exhibiting a fine-sized average particle size of (e.g., 2 µm, 10 µm, 20 µm, 30 µm, 40 µm). In an embodiment, the fine-sized average particle size of layer 302 is less than about 20 µm, the medium-sized average particle size of layer 304 is at least about 50 µm, and the coarse-sized average particle size of layer 306 is at least about 100 µm. Such a precursor assembly may be subjected to HPHT processing at any of the HPHT conditions disclosed herein. Although the illustrated embodiment utilizes three layers of diamond particles, one or more, two or more, or more than three layers may be employed.

Figure 3B:
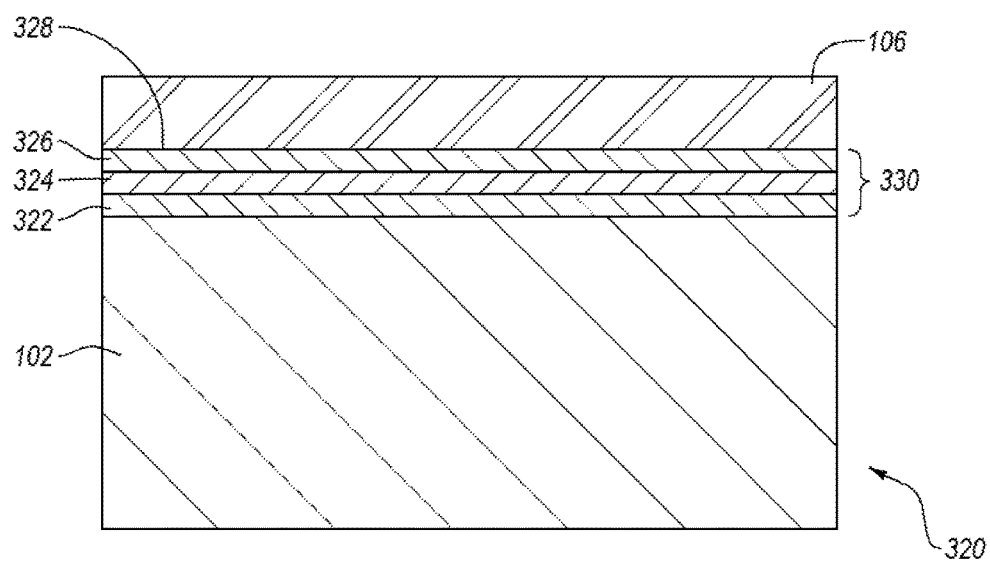
FIG. 3B is a cross-sectional view of a PDC formed by HPHT processing of the PDC precursor assembly shown in FIG. 3A.

FIG. 3B illustrates a cross-sectional view of an embodiment of a PDC 320 formed by HPHT processing of the PDC precursor assembly 300 shown in FIG. 3A. During HPHT processing, an intermediate PCD region 330 is formed that comprises a plurality of PCD layers 322, 324, and 326, which is positioned between and bonded to the sintered substantially single-phase PCD body 106 and the substrate 102. The sintered substantially single-phase PCD body 106 is formed from the at least one layer of non-diamond carbon 308. The intermediate PCD region 330 includes a plurality of directly bonded-together diamond grains exhibiting diamond-to-diamond bonding therebetween (e.g., sp³ bonding) formed at least partially from the plurality of PCD layers 322, 324, and 326 and metal-solvent catalyst infiltrated from the substrate 102 that catalyzes formation of PCD. The plurality of directly bonded-together diamond grains defines a plurality of interstitial regions. The intermediate PCD region 330 includes a metal-solvent catalyst (e.g., iron, nickel, cobalt, or alloys thereof) that may be disposed in at least a portion of the interstitial regions, which was infiltrated from the substrate 102. For example, the metal-solvent catalyst may be disposed in substantially all or only a portion of the interstitial regions.

In one embodiment, the metal-solvent catalyst may infiltrate the PCD layers 322, 324, and 326 and the amount/concentration of the metal-solvent catalyst may decrease with distance from the substrate 102 toward the sintered substantially single-phase PCD body 106. For example, the amount of the metal-solvent catalyst in the layer 322 is greater than the amount of the metal-solvent catalyst in the layer 324, and the amount of the metal-solvent catalyst in the layer 324 is greater than the amount of the metal-solvent catalyst in the layer 326. As the average diamond particle size of the plurality of layers of diamond particles 302, 304, and 306 increases, the amount of the metal-solvent catalyst incorporated into the PCD layers 322, 324, and 326 so formed decreases. By decreasing the amount of metal-solvent catalyst toward the sintered substantially single-phase PCD body 106 in the PCD region 330, the thermal stability of the overall PDC 320 may be sufficient while also providing an effective means to bond the sintered substantially single-phase PCD body 106 to the substrate 102.

Figure 4A:
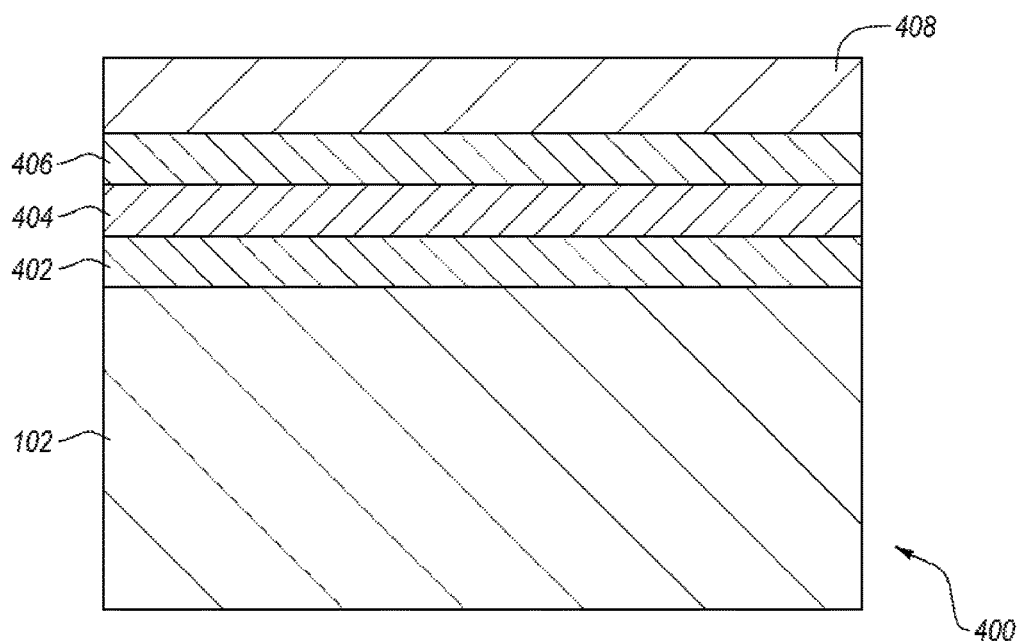
FIG. 4A is a cross-sectional view of an embodiment of a PDC precursor assembly including a plurality of layers of non-diamond carbon particles having different respective average particle sizes positioned between a mass of non-diamond carbon and a substrate.

FIG. 4A illustrates a cross-sectional view of an embodiment of a PDC precursor assembly 400 for integrally forming the sintered substantially single-phase PCD body 106 (FIG. 4B) with the substrate 102. Generally, the precursor assembly may include a substrate and one or more layers of non-diamond carbon, diamond particles, or mixtures of graphite and diamond particles. In the illustrated embodiment, the PDC precursor assembly 400 includes the substrate 102, at least one layer of non-diamond carbon 408

(e.g., any of the graphite particles and/or amorphous carbon disclosed herein), and a plurality of layers of non-diamond carbon particles 402, 404, and 406 (e.g., graphite particles and/or amorphous carbon particles) disposed between the mass of the plurality of graphite particles 408 and the substrate 102. The plurality of layers of non-diamond carbon particles 402, 404, and 406, respectively may exhibit different properties, compositions, average particle sizes, or combinations thereof. For example, the average particle size may increase from the layer 402 to the layer 406, with a fine-sized average particle size in the layer 402, a medium-sized average particle size in the layer 404, and a coarse-sized average particle size in the layer 406. Although the illustrated embodiment shows three layers, two or more layers of graphite particles or more than three layers of graphite particles may be employed. In some embodiments, the coarse-sized average particle size in the layer 406 is about 2 times that of the medium-sized average particle size in the layer 404, and the coarse-sized average particle size is about 5 times that of the fine-sized average particle size in the layer 402. In an embodiment, the fine-sized average particle size of the layer 402 is less than about 20 μm, the medium-sized average particle size of the layer 404 is at least about 50 μm, and the coarse-sized average particle size of the layer 406 is at least about 100 μm. Such a precursor assembly may be subjected to HPHT processing at any of the HPHT conditions disclosed herein.

Figure 4B:
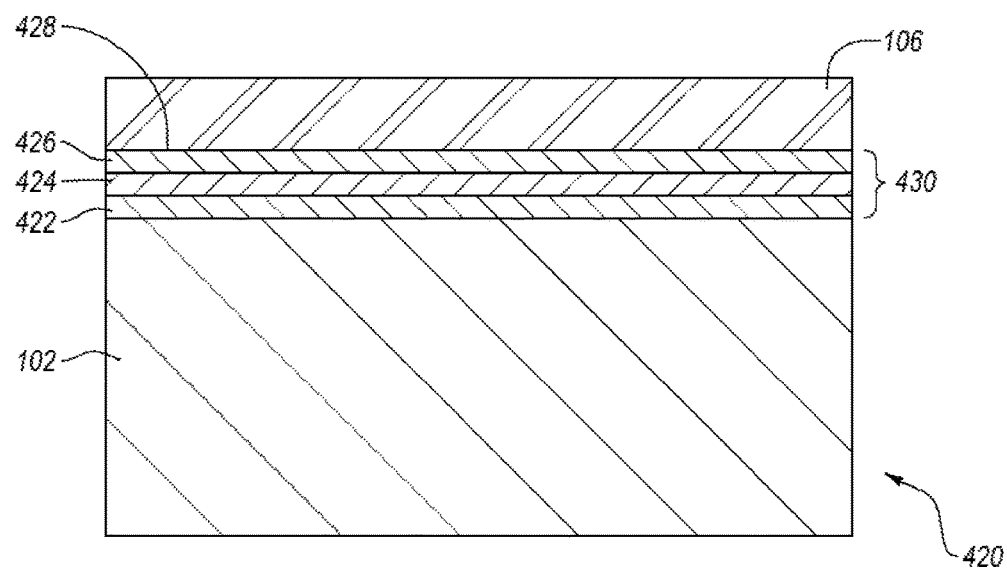
FIG. 4B is a cross-sectional view of a PDC formed by HPHT processing of the PDC precursor assembly shown in FIG. 4A.

FIG. 4B illustrates a cross-sectional view of an embodiment of a PDC 420 formed by HPHT processing of the PDC precursor assembly 400 shown in FIG. 4A. During HPHT processing, a plurality of PCD layers 422, 424, and 426 form an intermediate PCD region 430. The sintered substantially single-phase PCD body 106 is formed from the mass of non-diamond carbon 408. The intermediate PCD region 430 includes a plurality of directly bonded-together diamond grains exhibiting diamond-to-diamond bonding therebetween (e.g., $sp^3$ bonding) that comprises a plurality of PCD layers 422, 424, and 426 and metal-solvent catalyst infiltrated from the substrate 102 that catalyzes formation of the plurality of PCD layers 422, 424, and 426. The plurality of directly bonded-together diamond grains defines a plurality of interstitial regions. The metal-solvent catalyst (e.g., iron, nickel, cobalt, or alloys thereof) that may be disposed in at least a portion of the interstitial regions between the diamond grains of the plurality of PCD layers 422, 424, and 426. For example, the metal-solvent catalyst may be disposed in substantially all or only a portion of the interstitial regions of the plurality of PCD layers 422, 424, and 426. Although the illustrated embodiment utilizes three layers of graphite particles, one or more, two or more, or more than three layers may be employed.

Referring to FIG. 4B, in one embodiment, the metal-solvent catalyst may infiltrate the plurality of layers of non-diamond carbon particles 402, 404, and 406 during HPHT processing with the amount/concentration of the metal-solvent catalyst decreasing with distance from the substrate 102 toward the sintered substantially single-phase PCD body 106. For example, the amount of the metal-solvent catalyst in the layer 422 is greater than the amount of the metal-solvent catalyst in the layer 424, and the amount of the metal-solvent catalyst in the layer 424 is greater than the amount of infiltrant in the layer 426. As the average particle size of the plurality of layers of non-diamond carbon particles 402, 404, and 406 increases, the amount of the metal-solvent catalyst incorporated into the PCD layers 422, 424, and 426 so formed decreases. By decreasing the amount of metal-solvent catalyst in the PCD region 430 with distance from the substrate 102 toward the sintered substantially single-phase PCD body 106, the thermal stability of the overall PDC 420 may be sufficient while also providing an effective means to bond the sintered substantially single-phase PCD body 106 to the substrate 102.

Figure 5A:
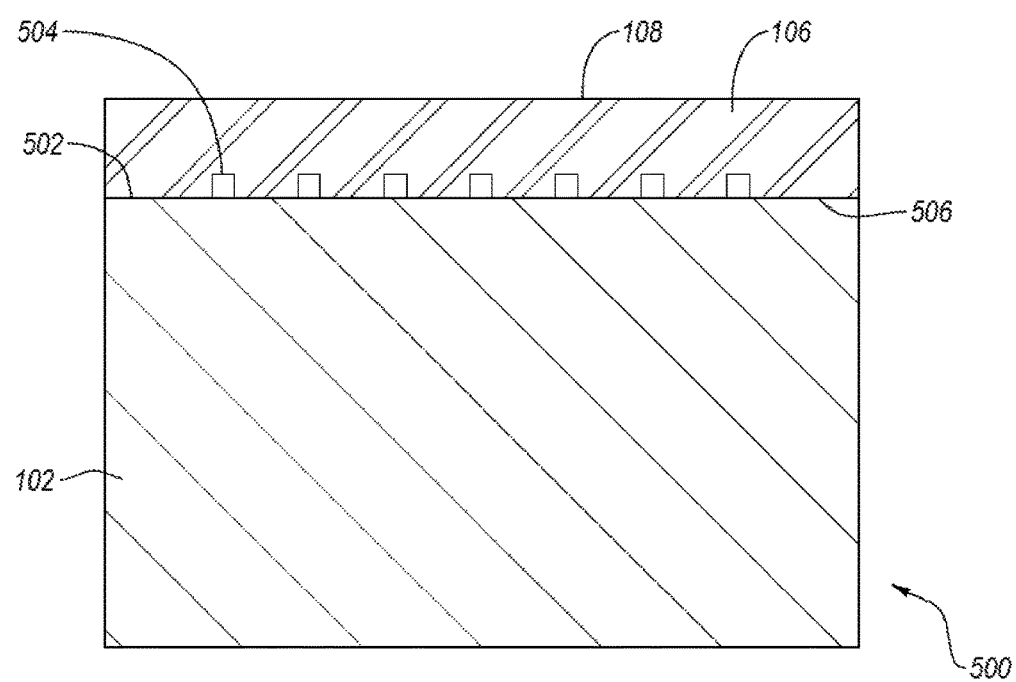
FIG. 5A is a cross-sectional view of a PDC precursor assembly illustrating empty recesses in an interfacial surface of a preformed sintered substantially single-phase PCD body to be bonded to a substrate according to an embodiment.

FIG. 5A illustrates a cross-sectional view of an embodiment of a PDC precursor assembly 500, in which a laser-ablated interfacial surface of a preformed (i.e., "freestanding") sintered substantially single-phase PCD body 106 has a porous interfacial surface 506 (including a plurality of recesses, pits, depressions, or voids 504 therein) generally opposite working surface 108. FIG. 5A illustrates the empty recesses 504 of the porous interfacial surface 506, shown open to the interfacial surface 502 of the substrate 102.

A laser ablation method may be used to create the porous interfacial surface 506 in the sintered substantially single-phase PCD body 106. Various different laser ablation techniques are disclosed in U.S. application Ser. No. 13/166,007 filed on 22 Jun. 2011, which is incorporated herein, in its entirety, by this reference. In an embodiment, laser energy is applied to an exterior surface to remove diamond material adjacent to the exterior surface effective to form the recesses 504 therein. In some embodiments, laser energy is applied to the exterior surface of the sintered substantially single-phase PCD body 106 in a series of passes with the laser so that diamond material is removed to a first depth in a first pass and at least one subsequent pass thereafter removes diamond material adjacent to and at a depth greater than the diamond material removed in the immediately previous pass of the laser. Such progressive formation of the laser cut in the sintered substantially single-phase PCD body 106 prevents or minimizes any thermal damage thereto as the depth of material removed in each pass is sufficiently low so as to substantially prevent overheating or damage to adjacent diamond material. For example, such progressive laser cutting can prevent or minimize back conversion of diamond to graphite or amorphous carbon that may otherwise result where heat from the laser cutting is absorbed too rapidly into adjacent diamond material. Multiple passes, particularly when separated by rest periods, allow the heat to better dissipate, resulting in an overall lower temperature rise within the material adjacent to that being laser cut. Such an ablation method may provide the porous interfacial surface 506 of the sintered substantially single-phase PCD body 106 as shown in FIG. 5A.

FIG. 5B illustrates a cross-sectional view of an embodiment of a PDC 520 formed by HPHT processing of the PDC precursor assembly 500 shown in FIG. 5A. During the HPHT process, an infiltrant from the substrate 102 or other source infiltrates into the porous interfacial surface 506 of the sintered substantially single-phase PCD body 106, at least partially or substantially completely filling the recesses 504 with the infiltrant 522 so that the sintered substantially single-phase PCD body 106 bonds to the substrate 102 upon cooling from the HPHT process. For example, the infiltrant may be cobalt provided from a cobalt-cemented tungsten carbide substrate. In another embodiment, the recesses 504 may be filled with a metal or alloy powder, tungsten carbide powder, or mixtures thereof prior to the HPHT process to facilitate bonding of the sintered substantially single-phase PCD body 106 to the substrate 102.

Figure 6A:
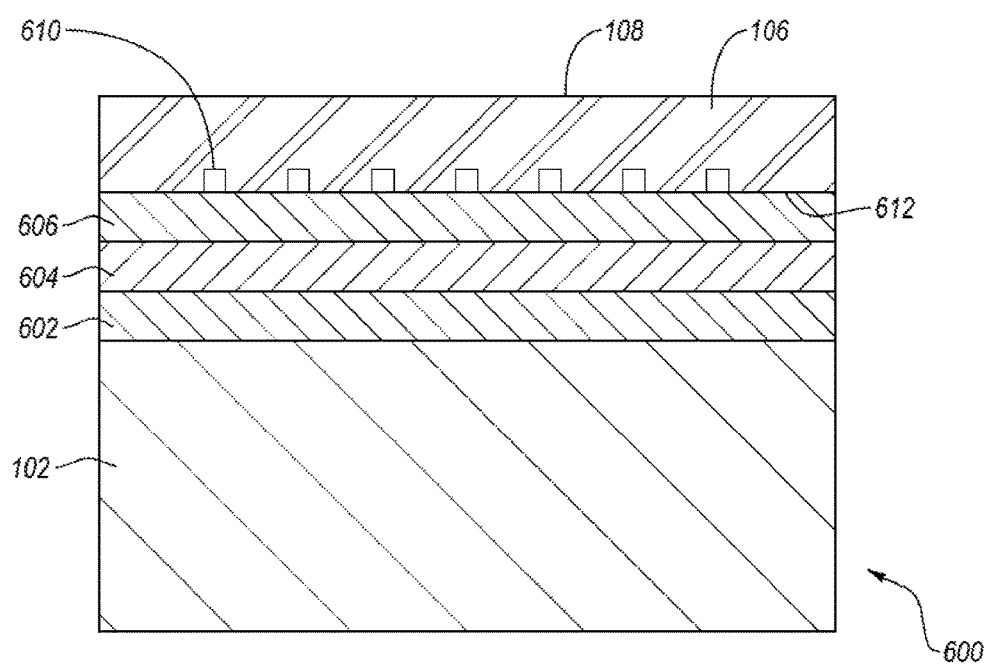
FIG. 6A illustrates a cross-sectional view of a PDC precursor assembly including a plurality of layers of non-diamond carbon particles, diamond particles, or mixtures of diamond particles and non-diamond carbon particles disposed between a preformed sintered substantially single-phase PCD body and a substrate according to an embodiment.

FIG. 6A illustrates a cross-sectional view of an embodiment of a PDC precursor assembly 600 for integrally forming the sintered substantially single-phase PCD body 106 with the substrate 102. The precursor assembly 600 includes a plurality of layers of non-diamond carbon particles (e.g., graphite and/or amorphous particles), diamond particles, or mixtures of diamond particles and graphite particles in layers 602, 604, and 606 disposed between the sintered substantially single-phase PCD body 106 and the substrate 102. The plurality of layers of particles 602, 604, and 606, respectively, have different properties, composition, average particle sizes, or combinations thereof. In one embodiment, the average particle size increases from the layer 602 to the layer 606, with a fine-sized average particle size in the layer 602, a medium-sized average particle size in the layer 604, and a coarse-sized average particle size in the layer 606. In some embodiments, the coarse-sized average particle size in the layer 606 is about 2 times that of the medium-sized average particle size in the layer 604, and the coarse-sized average particle size is about 5 times that of the fine-sized average particle size in the layer 602. In an embodiment, the fine-sized average particle size of the layer 602 is less than about 20 μm, the medium-sized average particle size of the layer 604 is at least about 50 μm, and the coarse-sized average particle size of the layer 606 is at least about 100 μm. Such a precursor assembly may be subjected to HPHT processing at any of the HPHT conditions disclosed herein.

The preformed (i.e., "freestanding") sintered substantially single-phase PCD body 106, substantially free of metal-catalyst, may exhibit a porous interfacial surface 612 similar to that shown in FIG. 5A, which is positioned adjacent to the plurality of particle layers 602, 604, and 606. For example, the porous interfacial surface 612 may exhibit empty recesses 610 therein (created using the laser ablation methods described above). In another embodiment, the plurality of particle layers 602, 604, and 606 may be comprised of graphite particles similar to the embodiment described above with respect to FIGS. 4A and 4B.

FIG. 6B illustrates a cross-sectional view of an embodiment of a PDC 620 formed by HPHT processing of the PDC precursor assembly 600 shown in FIG. 6A. As shown in FIG. 6B, an intermediate PCD region 630 is formed that comprises a plurality of PCD layers 622, 624, and 626, which is positioned between and bonded to the sintered substantially single-phase PCD body 106 and the substrate 102. This intermediate PCD region 630 includes a plurality of directly bonded-together diamond grains exhibiting diamond-to-diamond bonding therebetween (e.g., sp³ bonding) formed at least partially from the plurality of particle layers 602, 604, and 606 and metal-solvent catalyst infiltrated from the substrate 102 that catalyzes formation of the PCD layers 622, 624, and 626. The plurality of directly bonded-together diamond grains defines a plurality of interstitial regions. The metal-solvent catalyst (e.g., iron, nickel, cobalt, or alloys thereof) may be disposed in at least a portion of the interstitial regions. For example, the metal-solvent catalyst may be disposed in substantially all or only a portion of the interstitial regions.

In one embodiment, the infiltrant/metal-solvent catalyst may infiltrate the plurality of particle layers 602, 604, and 606 and the amount/concentration of the infiltrant/metal-solvent catalyst may decrease with distance from the substrate 102 toward the sintered substantially single-phase PCD body 106. For example, the amount of the infiltrant/metal-solvent catalyst in the PCD layer 622 is greater than the amount of infiltrant/metal-solvent catalyst in the PCD layer 624, and the amount of infiltrant/metal-solvent catalyst in the PCD layer 624 is greater than the amount of infiltrant/metal-solvent catalyst in the PCD layer 626. The infiltrant/metal-solvent catalyst from the substrate 102 or other source may also infiltrate and at least partially or substantially completely fill the recesses 610 of the porous interfacial surface 632 of the PCD body 106 with the infiltrant/metal-solvent catalyst 628 that bonds the infiltrated sintered substantially single-phase PCD body 106 to the intermediate PCD region 630 and the substrate 102 upon cooling from the HPHT process.

FIG. 7 is a cross-sectional view of an embodiment of a PCD 700 having the preformed (i.e., "freestanding") sintered substantially single-phase PCD body 106 directly brazed onto the substrate 102 via a braze material 710. The braze material 710 is disposed between an interfacial surface 730 of the substrate 102 and an interfacial surface 720 of the sintered substantially single-phase PCD body 106. The braze material 710 provides a strong metallurgical bond between the sintered substantially single-phase PCD body 106 and the substrate 102. The brazing may be conducted in an HPHT process, vacuum brazing, induction brazing, or other suitable brazing/heating process sufficient to at least partially melt and re-flow the braze material 710. For example, various HPHT brazing techniques (including can assemblies within which the sintered substantially single-phase PCD body 106, the substrate 102, and the braze material 710 may be sealed) are disclosed in U.S. patent application Ser. No. 11/545,929 filed on 10 Oct. 2006, the disclosure of which is incorporated herein, in its entirety, by this reference.

In an embodiment, the braze material 710 may be made from a foil having a selected braze alloy composition and thickness. In another embodiment, the braze material 710 may be in powder form.

Suitable braze alloys for the braze material 710 may be selected from gold alloys, silver alloys, iron-nickel alloys, and other suitable braze alloys. In an embodiment, the braze alloy may include about 4.5 wt % titanium, about 26.7 wt % copper, and about 68.8 wt % silver, otherwise known as Ticusil®, which is currently commercially available from Wesgo Metals of Hayward, Calif. In another embodiment, the braze alloy may include about 25 wt % silver, about 37 wt % copper, about 10 wt % nickel, about 15 wt % palladium, and about 13 wt % manganese, otherwise known as Palnicrurom® 10, which is also currently commercially available from Wesgo Metals of Hayward, Calif. In a further embodiment, the braze alloy may include about 64 wt % iron and about 36 wt % nickel, which is often referred to as Invar. Other suitable braze alloys include AWS BAg-1 (44-46 wt % Ag, 14-16 wt % Cu, 14-18 wt % Zn, and 23-25 wt % Cd), AWS BAg-7 (55-57 wt % Ag, 21-23 wt % Cu, 15-19 wt % Zn, and 4.5-5.5 wt % Sn), and AWS BAg-24 (59-51 wt % Ag, 19-21 wt % Cu, 26-30 wt % Zn, and 1.5-2.5 wt % Ni). In other embodiments, the braze material may be made from a foil of a pure metal.

In another embodiment, the interfacial surface 720 of the sintered substantially single-phase PCD body 106 may be laser ablated to form a plurality of recesses therein similar to the embodiment shown in FIGS. 5A-6B. In such an embodiment, the braze material may infiltrate into the recesses to bond the sintered substantially single-phase PCD body 106 to the substrate 102.

FIGS. 8A-8D are cross-sectional views illustrating different stages in various embodiments of a method for fabricating a PDC and the PDC so formed. According to the various embodiments described with respect to FIGS. 8A-8D, a mass of non-diamond carbon (e.g., graphite and/or amorphous carbon particles) is positioned adjacent to a mass including a mixture of non-diamond carbon particles and sacrificial particles. After HPHT processing, a sintered substantially single-phase PCD body is formed that is bonded to a PCD layer with a sacrificial material therein, and the sacrificial material can be at least partially leached to create pores that can be infiltrated to bond the structure to a substrate.

Referring to FIG. 8A, an assembly 800 may be formed by positioning a mass of non-diamond carbon 804 adjacent to a mixture 802 that includes a plurality of non-diamond carbon particles (e.g., graphite and/or amorphous carbon particles), diamond particles, a plurality of sacrificial particles, or combinations thereof. For example, the sacrificial particles may be present in the mixture in a concentration of greater than 0 wt % to about 15 wt %, about 1.0 wt % to about 10 wt %, about 1.0 wt % to about 5 wt %, about 1.5 wt % to about 2.5 wt %, about 1.0 wt % to about 2.0 wt %, or about 2.0 wt %, with the balance substantially being the non-diamond carbon particles. It is currently believed that relatively low amounts of the sacrificial particles (e.g., less than about 5 wt %, less than about 3 wt %, or less than about 2 wt %) increases accessibility for leaching the PCD layer without significantly affecting the wear properties of the PCD so formed. The sacrificial particles may exhibit an average particle size (e.g., an average diameter) of about submicron to about 10 about submicron to about 5 less than about 5 about submicron to about 2 about submicron to about 1 less than about 1 or nanometer in dimensions such as about 10 nm to about 100 nm.

The sacrificial particles may be formed from a variety of different materials. For example, the sacrificial particles may be selected from particles made from metals, alloys, carbides, and combinations thereof that are leachable from the PCD layer so formed via a leaching process. For example, the sacrificial particles may be selected from particles made of refractory metals (e.g., niobium, molybdenum, tantalum, tungsten, rhenium, hafnium, and alloys thereof), and other metals or alloys. As another example, the sacrificial particles may be selected from particles of titanium, vanadium, chromium, iron, zirconium, niobium, molybdenum, hafnium, tantalum, tungsten, rhenium, alloys of any of the foregoing metals, carbides of any of the foregoing metals or alloys, and combinations of the foregoing. For example, in a more specific embodiment, the sacrificial particles may be selected from tungsten particles and/or tungsten carbide particles.

The non-diamond particles may exhibit any of the particle sizes and distributions disclosed herein. In an embodiment, the sacrificial particles may have an average particle size that is less than an average particle size of the graphite particles.

FIG. 8B is a cross-sectional view of an embodiment of a PCD structure 810 formed by HPHT processing of the assembly 800 shown in FIG. 8A to form a PCD structure 810. The PCD structure 810 includes the sintered substantially single-phase PCD body 106, which is substantially free of metal-solvent catalyst. The PCD structure 810 further includes a PCD layer 812 integrally formed with and bonded to the sintered substantially single-phase PCD body 106 during HPHT processing of the assembly 800. Like the sintered substantially single-phase PCD body 106, the PCD layer 812 includes a plurality of directly bonded-together diamond grains exhibiting diamond-to-diamond bonding (e.g., $sp^3$ bonding) therebetween.

The bonded-together diamond grains of the PCD layer 812 define a plurality of interstitial regions. The interstitial regions include the sacrificial material (e.g., tungsten carbide grains) disposed therein. The sacrificial material may include at least one reaction product formed from sacrificial particles that at least partially react with the non-diamond carbon particles during HPHT processing and/or the sacrificial particles that are present in the mixture 802. For example, tungsten sacrificial particles may at least partially react with the non-diamond carbon particles to form tungsten carbide grains.

FIG. 8C is a cross-sectional view of an embodiment of a PCD structure 820 formed by leaching of the PCD structure 810 shown in FIG. 8B. The PCD layer 812 of the PCD structure 810 may be exposed to an acid to leach at least a portion of the sacrificial material from the interstitial regions to form an at least partially leached PCD layer 822 (i.e., a porous region) having had the sacrificial material substantially removed. However, a residual amount of the sacrificial material may remain even after leaching, such as about 0.1 wt % to about 0.8 wt %. As shown in the embodiment of FIG. 8C, the at least partially leached PCD layer 822 includes an interfacial surface 828, with the interstitial regions having been leached of the sacrificial material so that the interstitial regions form a network of at least partially interconnected pores configured to allow fluid to flow between and through the at least partially leached PCD layer 822.

Suitable leaching agents include, but are not limited to, dilute nitric acid (e.g., about 0.5 M to about 1.5 M), concentrated nitric acid (e.g., about 4 M to about 5 M), hydrofluoric acid, or mixtures thereof. For example, the PCD layer 822 may be exposed to any of such acids for about 2 to about 7 days (e.g., about 3, 5, or 7 days) or even for a few weeks (e.g., about 2 to about 4 weeks). Hydrofluoric acid may enhance removal of the tungsten carbide grains because tungsten oxide may be formed as a reaction product between water, and tungsten oxide is soluble in hydrofluoric acid. Various leaching techniques are disclosed in U.S. patent application Ser. No. 12/608,155, filed on 29 Oct. 2009, the disclosure of which are incorporated herein, in their entirety, by this reference.

FIG. 8D is a cross-sectional view of a PDC 830 formed by placing the interfacial surface 828 of the at least partially leached PCD layer 822 (shown in FIG. 8C) adjacent to the substrate 102 and subjecting the assembly to HPHT processing using any of the HPHT conditions disclosed herein. During the HPHT process the pores of the at least partially leached PCD layer 822 may be infiltrated with a metallic infiltrant from the substrate 102 to form an infiltrated PCD layer 832 as illustrated in FIG. 8D. For example, cobalt from a cobalt-cemented tungsten carbide substrate may infiltrate the pores of the at least partially leached PCD layer 822 during the HPHT process. The substrate 102 bonds to the infiltrated PCD layer 832 upon cooling to form the PDC 830.

In another embodiment, the at least partially leached PCD layer 822 may be bonded to the substrate 102 by brazing using any of the braze materials disclosed herein. For example, the braze material may be placed between the at least partially leached PCD region 822 and the substrate 102 and heated sufficiently to at least partially infiltrate the at least partially leached PCD region 822 and bond the at least partially leached PCD region 822 to the substrate 102.

In any of the embodiments, described above in FIGS. 3A-8D, the PDCs so formed may be subjected to a number of different post HPHT processing shaping operations. For example, the substantially single-phase PCD body may be subjected to grinding and/or machining (e.g., electro-discharge and/or laser machining) operations to, for example, chamfer the substantially single-phase PCD body and/or planarize the upper surface of the substantially single-phase PCD body.

Figure 11:
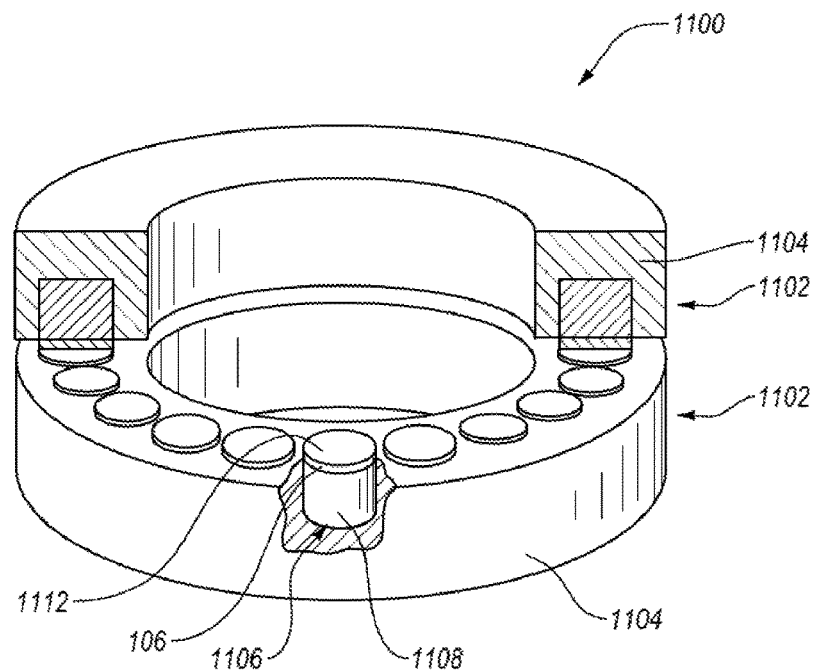
FIG. 11 is an isometric cut-away view of an embodiment of a thrust-bearing apparatus that may utilize one or more of the disclosed PDC embodiments.
Figure 12:
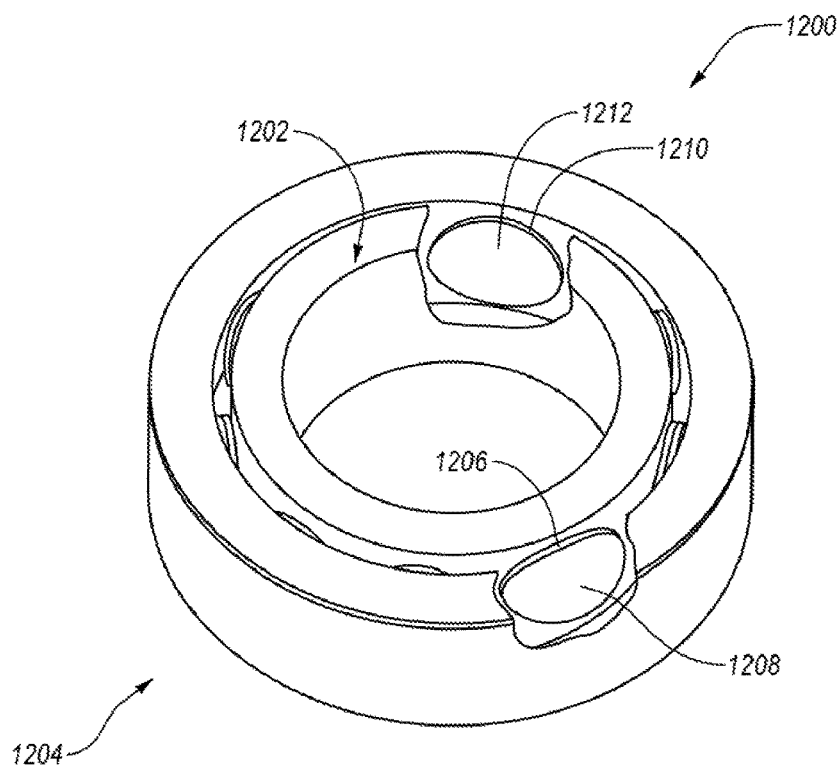
FIG. 12 is an isometric cut-away view of an embodiment of a radial bearing apparatus that may utilize one or more of the disclosed PDC embodiments.

The disclosed PDC embodiments may be used in a number of different applications including, but not limited to, use in a rotary drill bit (FIGS. 9 and 10), a thrust-bearing apparatus (FIG. 11), and a radial bearing apparatus (FIG. 12). The various applications discussed above are merely some examples of applications in which the PDC embodiments may be used. Other applications are contemplated, such as employing the disclosed PDC embodiments in friction stir welding tools.

Figure 9:
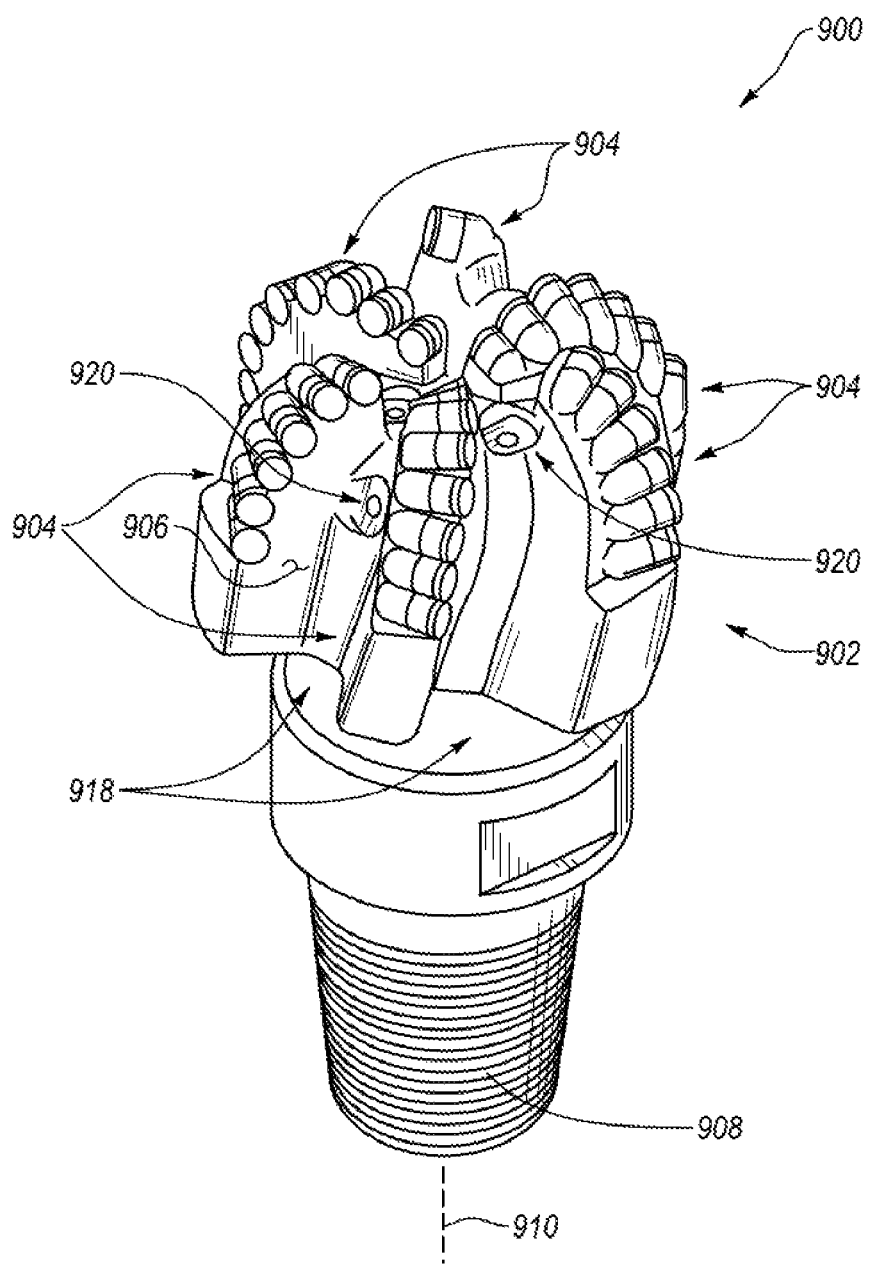
FIG. 9 is an isometric view of an embodiment of a rotary drill bit that may employ one or more of the disclosed PDC embodiments.
Figure 10:
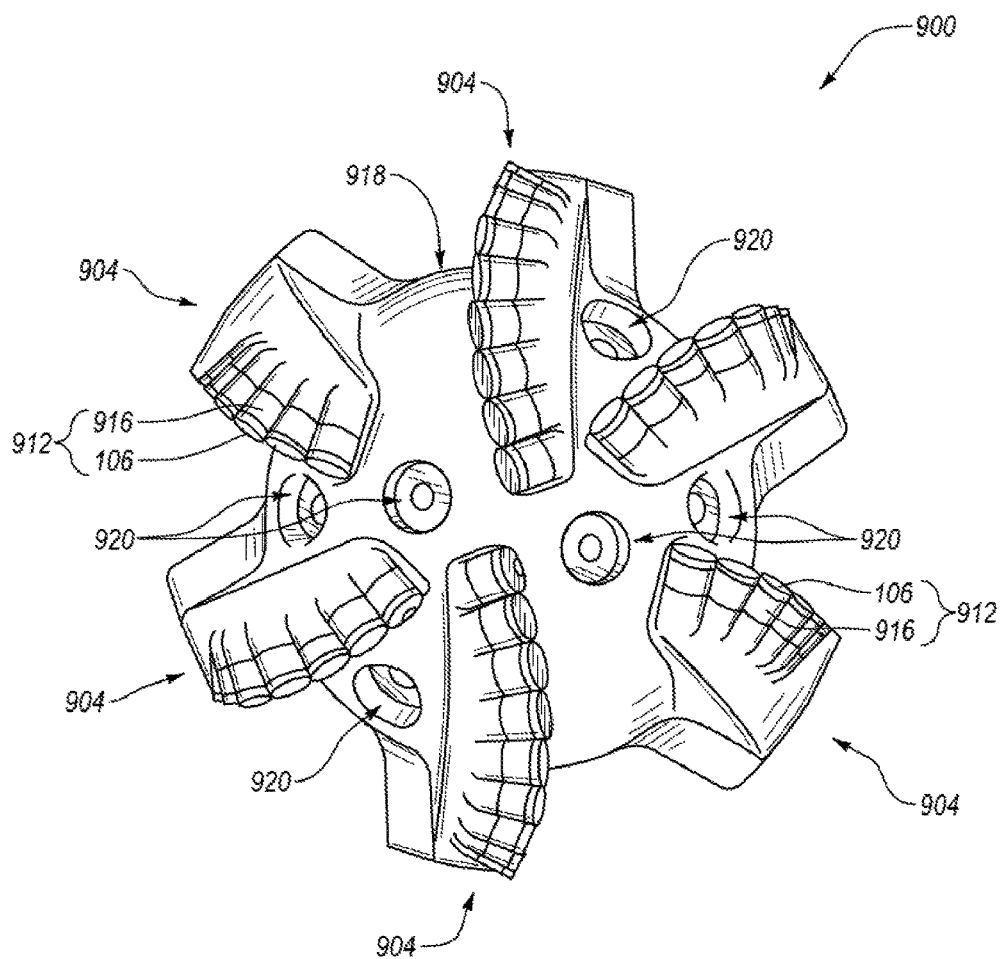
FIG. 10 is a top elevation view of the rotary drill bit shown in FIG. 9.

FIG. 9 is an isometric view and FIG. 10 is a top elevation view of an embodiment of a rotary drill bit 900. The rotary drill bit 900 includes at least one PDC configured according to any of the previously described PDC embodiments. The rotary drill bit 900 comprises a bit body 902 that includes radially and longitudinally extending blades 904 with leading faces 906, and a threaded pin connection 908 for connecting the bit body 902 to a drilling string. The bit body 902 defines a leading end structure for drilling into a subterranean formation by rotation about a longitudinal axis 910 and application of weight-on-bit. At least one PDC cutting element, configured according to any of the previously described PDC embodiments (e.g., the PDC 100 shown in FIG. 1), may be affixed to the bit body 902. With reference to FIG. 10, a plurality of PDCs 912 is secured to the blades 904. For example, each PDC 912 may include a sintered substantially single-phase PCD body 106 bonded to a substrate 916. More generally, the PDCs 912 may comprise any PDC disclosed herein, without limitation. In addition, if desired, in some embodiments, a number of the PDCs 912 may be conventional in construction. Also, circumferentially adjacent blades 904 define so-called junk slots 918 there between, as known in the art. Additionally, the rotary drill bit 900 may include a plurality of nozzle cavities 920 for communicating drilling fluid from the interior of the rotary drill bit 900 to the PDCs 912.

FIGS. 9 and 10 merely depict an embodiment of a rotary drill bit that employs at least one cutting element comprising a PDC fabricated and structured in accordance with the disclosed embodiments, without limitation. The rotary drill bit 900 is used to represent any number of earth-boring tools or drilling tools, including, for example, core bits, roller-cone bits, fixed-cutter bits, eccentric bits, bicenter bits, reamers, reamer wings, or any other downhole tool including PDCs, without limitation.

The PDCs and/or PCD materials disclosed herein (e.g., the PDC 100 shown in FIG. 1) may also be utilized in applications other than rotary drill bits. For example, the disclosed PDC and/or PCD material embodiments may be used in thrust-bearing assemblies, radial bearing assemblies, wire-drawing dies, artificial joints, machining elements, and heat sinks.

FIG. 11 is an isometric cut-away view of an embodiment of a thrust-bearing apparatus 1100, which may utilize any of the disclosed PDC embodiments as bearing elements. The thrust-bearing apparatus 1100 includes respective thrust-bearing assemblies 1102. Each thrust-bearing assembly 1102 includes an annular support ring 1104 that may be fabricated from a material, such as carbon steel, stainless steel, or another suitable material. Each support ring 1104 includes a plurality of recesses (not labeled) that receive a corresponding bearing element 1106. Each bearing element 1106 may be mounted to a corresponding support ring 1104 within a corresponding recess by brazing, press-fitting, using fasteners, or another suitable mounting technique. One or more, or all of bearing elements 1106 may be configured according to any of the disclosed PDC embodiments. For example, each bearing element 1106 may include a substrate 1108 and a sintered substantially single-phase PCD body 106, with the sintered substantially single-phase PCD body 106 including a bearing surface 1112.

In use, the bearing surfaces 1112 of one of the thrust-bearing assemblies 1102 bear against the opposing bearing surfaces 1112 of the other one of the bearing assemblies 1102. For example, one of the thrust-bearing assemblies 1102 may be operably coupled to a shaft to rotate therewith and may be termed a "rotor." The other one of the thrust-bearing assemblies 1102 may be held stationary and may be termed a "stator."

FIG. 12 is an isometric cut-away view of an embodiment of a radial bearing apparatus 1200, which may utilize any of the disclosed PDC embodiments as bearing elements. The radial bearing apparatus 1200 includes an inner race 1202 positioned generally within an outer race 1204. The outer race 1204 includes a plurality of bearing elements 1206 affixed thereto that have respective bearing surfaces 1208. The inner race 1202 also includes a plurality of bearing elements 1210 affixed thereto that have respective bearing surfaces 1212. One or more, or all of the bearing elements 1206 and 1210 may be configured according to any of the PDC embodiments disclosed herein. The inner race 1202 is positioned generally within the outer race 1204, and thus the inner race 1202 and outer race 1204 may be configured so that the bearing surfaces 1208 and 1212 may at least partially contact one another and move relative to each other as the inner race 1202 and outer race 1204 rotate relative to each other during use.

The radial bearing apparatus 1200 may be employed in a variety of mechanical applications. For example, so-called "roller-cone" rotary drill bits may benefit from a radial-bearing apparatus disclosed herein. More specifically, the inner race 1202 may be mounted to a spindle of a roller cone and the outer race 1204 may be mounted to an inner bore formed within a cone and such an outer race 1204 and inner race 1202 may be assembled to form a radial bearing apparatus.

While various aspects and embodiments have been disclosed herein, other aspects and embodiments are contemplated. The various aspects and embodiments disclosed herein are for purposes of illustration and are not intended to be limiting. Additionally, the words "including," "having," and variants thereof (e.g., "includes" and "has") as used herein, including the claims, shall be open ended and have the same meaning as the word "comprising" and variants thereof (e.g., "comprise" and "comprises").

What is claimed is:

1. A polycrystalline diamond compact, comprising:
    a sintered substantially single-phase polycrystalline diamond body consisting essentially of bonded-together diamond grains exhibiting a morphology different than that of a polycrystalline diamond body formed by sintering diamond crystals, wherein the sintered substantially single-phase polycrystalline diamond body includes substantially only one of carbon-12, carbon-13, or carbon-14; and
    a substrate bonded to the sintered substantially single-phase polycrystalline diamond body.

2. The polycrystalline diamond compact of claim 1 wherein the sintered substantially single-phase polycrystalline diamond body is brazed to the substrate.

3. The polycrystalline diamond compact of claim 1 wherein the sintered substantially single-phase polycrystalline diamond body includes an interfacial surface including a plurality of recesses therein, and wherein the plurality of recesses are at least partially filled with an infiltrant.

4. The polycrystalline diamond compact of claim 3 wherein the infiltrant comprises a metallic infiltrant infiltrated from the substrate.

5. The polycrystalline diamond compact of claim 1 wherein the sintered substantially single-phase polycrystalline diamond body is integrally formed with the substrate or a preformed polycrystalline diamond body.

6. The polycrystalline diamond compact of claim 1 wherein the sintered substantially single-phase polycrystalline diamond body includes a porous interfacial surface positioned adjacent to the substrate, the porous interfacial surface infiltrated with a metallic infiltrant from the substrate.

7. The polycrystalline diamond compact of claim 1, further comprising at least two polycrystalline diamond layers disposed between the sintered substantially single-phase polycrystalline diamond body and the substrate, wherein the at least two polycrystalline diamond layers includes metal-solvent catalyst therein.

8. The polycrystalline diamond compact of claim 7 wherein the at least two polycrystalline diamond layers includes:
a first polycrystalline diamond layer adjacent to the substrate including fine-sized polycrystalline diamond grains exhibiting a fine-sized average grain size;
a second polycrystalline diamond layer adjacent to the first polycrystalline diamond layer including medium-sized polycrystalline diamond grains exhibiting a medium-sized average grain size greater than the fine-sized average grain size;
a third polycrystalline diamond layer between the second polycrystalline diamond layer and the sintered substantially single-phase polycrystalline diamond body including coarse-sized polycrystalline diamond grains exhibiting a coarse-sized average grain size greater than the medium-sized average grain size; and
wherein the coarse-sized average grain size is at least about 2 times that of the medium-sized average grain size, and the coarse-sized average grain size is at least about 5 times that of the fine-sized average grain size.

9. The polycrystalline diamond compact of claim 8 wherein the first polycrystalline diamond layer includes a first amount of the metal-solvent catalyst, the second polycrystalline diamond layer includes a second amount of the metal-solvent catalyst that is less than the first amount, and the third polycrystalline diamond layer includes a third amount of the metal-solvent catalyst that is less than the second amount.

10. The polycrystalline diamond compact of claim 7 wherein at least one of the at least two polycrystalline diamond layers includes a residual amount of sacrificial materials therein.

11. The polycrystalline diamond compact of claim 1 wherein the substantially single-phase polycrystalline diamond body includes randomly oriented granular grains.

12. The polycrystalline diamond compact of claim 1 wherein the substantially single-phase polycrystalline diamond body exhibits a $G_{ratio}$ of at least about $5.0 \times 10^6$.

13. The polycrystalline diamond compact of claim 1 wherein the substantially single-phase polycrystalline diamond body exhibits a $G_{ratio}$ of at least about $20.0 \times 10^6$.

14. A polycrystalline diamond compact, comprising:
a sintered substantially single-phase polycrystalline diamond body consisting essentially of bonded-together diamond grains exhibiting a morphology different than that of a polycrystalline diamond body formed by sintering diamond crystals, the sintered substantially single-phase polycrystalline diamond body including working surface and a porous interfacial surface positioned opposite the working surface;
a substrate; and
at least one polycrystalline diamond layer positioned between the sintered substantially single-phase polycrystalline diamond body and the substrate, the at least one polycrystalline diamond layer bonded to the porous interfacial surface of the substantially single-phase polycrystalline diamond body and the substrate.

15. The polycrystalline diamond compact of claim 14 wherein the sintered substantially single-phase polycrystalline diamond body includes an interfacial surface including a plurality of recesses therein, the plurality of recesses substantially completely filled with an infiltrant.

16. The polycrystalline diamond compact of claim 14 wherein the at least one polycrystalline diamond layer includes:
a first polycrystalline diamond layer adjacent to the substrate including fine-sized polycrystalline diamond grains exhibiting a fine-sized average grain size;
a second polycrystalline diamond layer adjacent to the first polycrystalline diamond layer including medium-sized polycrystalline diamond grains exhibiting a medium-sized average grain size greater than the fine-sized average grain size;
a third polycrystalline diamond layer between the second polycrystalline diamond layer and the sintered substantially single-phase polycrystalline diamond body including coarse-sized polycrystalline diamond grains exhibiting a coarse-sized average grain size greater than the medium-sized average grain size; and
wherein the coarse-sized average grain size is at least about 2 times that of the medium-sized average grain size, and the coarse-sized average grain size is at least about 5 times that of the fine-sized average grain size.

17. A rotary drill bit, comprising:
a bit body including a leading end structure configured to facilitate drilling a subterranean formation; and
a plurality of polycrystalline diamond cutting elements mounted to the blades, at least one of the plurality of polycrystalline diamond cutting elements including:
a sintered substantially single-phase polycrystalline diamond body consisting essentially of bonded-together diamond grains exhibiting a morphology different than that of a polycrystalline diamond body formed by sintering diamond crystals and the substantially single-phase polycrystalline diamond body includes substantially only one of carbon-12, carbon-13, or carbon-14; and
a substrate bonded to the sintered substantially single-phase polycrystalline diamond body.

18. The rotary drill bit of claim 17 wherein the sintered substantially single-phase polycrystalline diamond body is brazed to the substrate.

19. The rotary drill bit of claim 17 wherein the sintered substantially single-phase polycrystalline diamond body includes an interfacial surface including a plurality of recesses therein, and wherein the plurality of recesses are at least partially filled with an infiltrant.

20. The polycrystalline diamond compact of claim 14 wherein the substantially single-phase polycrystalline diamond body includes substantially only one of carbon-12, carbon-13, or carbon-14.

* * * * *